(12) United States Patent
Rune et al.

(10) Patent No.: US 12,232,079 B2
(45) Date of Patent: *Feb. 18, 2025

(54) PROVISION OF DISTRIBUTED PAGING OCCASIONS

(71) Applicant: Telefonaktiebolaget LM Ericsson (publ), Stockholm (SE)

(72) Inventors: Johan Rune, Lidingö (SE); Claes-Göran Persson, Mjölby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 18/480,542

(22) Filed: Oct. 4, 2023

(65) Prior Publication Data
US 2024/0049173 A1 Feb. 8, 2024

Related U.S. Application Data

(63) Continuation of application No. 17/508,011, filed on Oct. 22, 2021, now Pat. No. 11,792,768, which is a (Continued)

(51) Int. Cl.
*H04W 68/00* (2009.01)
*G01L 9/00* (2006.01)
(Continued)

(52) U.S. Cl.
CPC ......... *H04W 68/005* (2013.01); *G01L 9/0054* (2013.01); *H04L 5/1469* (2013.01);
(Continued)

(58) Field of Classification Search
CPC ............... H04W 69/005; H04W 72/23; H04W 72/0446; H04W 24/08; H04L 5/1469; G01L 9/0054
See application file for complete search history.

(56) References Cited

U.S. PATENT DOCUMENTS

2010/0279715 A1   11/2010   Alanara et al.
2017/0331670 A1   11/2017   Parkvall et al.
(Continued)

FOREIGN PATENT DOCUMENTS

CN   101755475 A   6/2010
CN   106664681 A   5/2017
(Continued)

OTHER PUBLICATIONS

Nokia, Nokia Shanghai Bell, R2-1806931, 'Determination of PF and PO in NR', 3GPP TSG-RAN WG2 Meeting #102, Busan, May 21-Apr. 25, 2018, pp. 1-4. (Year: 2018).*
(Continued)

*Primary Examiner* — Melvin C Marcelo
(74) *Attorney, Agent, or Firm* — Sage Patent Group

(57) ABSTRACT

According to some embodiments, methods are provided to operate a base station of a wireless communication network. For example, parameters may be generated that define a plurality of potential PDCCH monitoring occasions and that define a plurality of paging occasions, wherein each one of the plurality of paging occasions includes a respective subset of the plurality of potential PDCCH monitoring occasions, wherein consecutive paging occasions are spaced apart in time with at least one of the potential PDCCH monitoring occasions therebetween not being included in any of the plurality of paging occasions. The parameters are transmitted over a radio interface to a wireless device. Related methods of operating wireless devices, related base stations, and related wireless devices are also discussed.

21 Claims, 17 Drawing Sheets

Related U.S. Application Data continuation of application No. 17/056,832, filed as application No. PCT/EP2019/066280 on Jun. 19, 2019, now Pat. No. 11,166,257.

(60) Provisional application No. 62/688,319, filed on Jun. 21, 2018.

(51) Int. Cl.
  *H04L 5/14* (2006.01)
  *H04W 24/08* (2009.01)
  *H04W 72/0446* (2023.01)
  *H04W 72/23* (2023.01)

(52) U.S. Cl.
  CPC ....... *H04W 24/08* (2013.01); *H04W 72/0446* (2013.01); *H04W 72/23* (2023.01)

(56) References Cited

U.S. PATENT DOCUMENTS

| | | |
|---|---|---|
| 2017/0347335 A1 | 11/2017 | Yi et al. |
| 2018/0124739 A1 | 5/2018 | Tabet et al. |
| 2020/0351822 A1 | 11/2020 | Roy et al. |
| 2021/0127355 A1 | 4/2021 | Gonzalez et al. |

FOREIGN PATENT DOCUMENTS

| | | |
|---|---|---|
| CN | 107079250 A | 8/2017 |
| RU | 2433571 C2 | 11/2011 |
| WO | 2017174469 A1 | 10/2017 |
| WO | 2018050053 A1 | 3/2018 |

OTHER PUBLICATIONS

Office Action including Search Report for Chinese Patent Application No. 201980041631.9 mailed Sep. 7, 2023, 7 pages.
MediaTek Inc., "Paging Enhancements," R2-161461, 3GPP TSG RAN WG2 Meeting #93, St. Julian's, Malta, Feb. 15-19, 2016, 6 pages.
Notice of Reasons for Rejection mailed Mar. 1, 2022 for Japanese Patent Application No. 2020-570500, 6 pages (English translation included).
Notice of Allowance mailed Oct. 7, 2022 for Korean Patent Application No. 2020-7307628, 7 pages. (English translation included).
Mediatek Inc.; 3GPP TSG-RAN WG2 Meeting #102; "Paging Frame and Paging Occasion Calculation in NR"; R2-1807743; Busan, Korea; May 21-25, 2018; 6 pages.
Ericsson; 3GPP TSG-RAN WG2 #102; "Calculation of Paging Occasion", R2-1806805; Busan, Korea; May 21-25, 2018; 5 pages.
Intel Corporation; 3GPP RAN WG2#101bis; "Calculation of Paging Occasion", R2-1805034; Sanya, China; Apr. 16-20, 2018; 3 pages.
Nokia, Nokia Shanghai Bell; "Determination of PF and PO in NR", R2-1804929; Sanya, China; Apr. 16-20, 2018; 8 pages.
Motorola Mobility, Lenovo; 3GPP TSG RAN WG1 AH-1801; "Remaining Details for NR Paging"; R1-1800726; Vancouver, Canada; Jan. 22-26, 2018; 4 pages.
Office Action mailed Dec. 10, 2021 for Canadian Patent Application No. 3,103,182, 4 pages.
Office Action mailed Jan. 5, 2022 for Indian Patent Application No. 202147002172, 6 pages.
International Search Report and Written Opinion of the International Searching Authority, PCT/EP2019/066280, mailed Sep. 18, 2019, 14 pages.
Samsung, "Reference Frame & PO Determination: Non Default Association", 3GPP TSG-RAN2 102, Busan, South Korea, May 21-May 25, 2018, R2-1807689, 7 pages.
Huawei et al., "Definition of Paging Occasion", 3GPP TSG-RAN WG2 #101bis, Sanya, China, Apr. 16-20, 2018, R2-1805758, 5 pages.
Ericsson, "Configuration of POS within a PF", 3GPP TSG-RAN WG2 AH 1807, Montreal, Canada, Jul. 2-6, 2018, Tdoc R2-1809723, 5 pages.
Russian Office Action with English Translation for Russian Patent Application No. 2020142341/07, dated Mar. 15, 2021, 8 pages.
Russian Search Report For Russian Patent Application No. 2020142341/07, dated Mar. 15, 2021, 2 pages.
3GPP TS 38.304, v15.0.0, Section 7.1, Paging, Jun. 20, 2018, 4 pages.

* cited by examiner

Figure 5

| Ns | PO (i.e. subframe) when i_s = 0 | PO (i.e. subframe) when i_s = 1 | PO (i.e. subframe) when i_s = 2 | PO (i.e. subframe) when i_s = 3 |
|---|---|---|---|---|
| 1 | 9 | N/A | N/A | N/A |
| 2 | 4 | 9 | N/A | N/A |
| 4 | 0 | 4 | 5 | 9 |

Figure 6

```
-- Slots for PDCCH Monitoring configured as periodicity and offset. Corresponds to L1
   parameters 'Monitoring-periodicity-PDCCH-slot' and
-- 'Monitoring-offset-PDCCH-slot' (see 38.213, section 10)
monitoringSlotPeriodicityAndOffset    CHOICE {
   sl1                                   NULL,
   sl2                                   INTEGER (0..1),
   sl4                                   INTEGER (0..3),
   sl5                                   INTEGER (0..4),
   sl8                                   INTEGER (0..7),
   sl10                                  INTEGER (0..9),
   sl16                                  INTEGER (0..15),
   sl20                                  INTEGER (0..19)
}                                                            OPTIONAL,  -- Cond
Setup -- Symbols for PDCCH monitoring in the slots configured for PDCCH monitoring (see
   monitoringSlotPeriodicityAndOffset)
-- The most significant (left) bit represents the first OFDM in a slot. The least significant
   (right) bit represents the last symbol.
-- Corresponds to L1 parameter 'Monitoring-symbols-PDCCH-within-slot' (see 38.213,
   section 10)
monitoringSymbolsWithinSlot            BIT STRING (SIZE (14)) OPTIONAL, --
Cond Setup
```

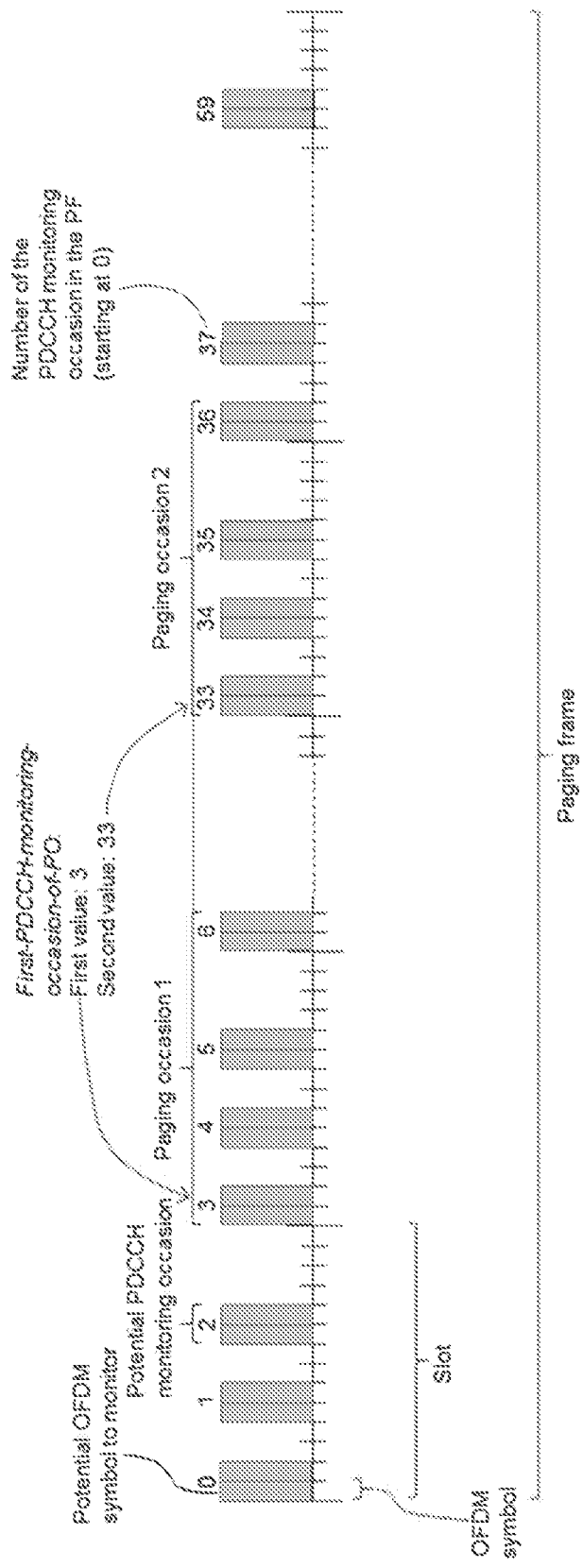

Method to Configure PDCCH Monitoring Occasion "bursts" Forming Paging Occasions Within a Paging Frame Figure 9
DownlinkConfigCommonSIB information element

| |
|---|
| -- ASN1START<br>-- TAG-DOWNLINK-CONFIG-COMMON-SIB-START<br><br>   \* \* \*<br>PCCH-Config ::=                    SEQUENCE {<br>   \* \* \*<br>    PF-Offset                      INTEGER (0 ... 15),<br>    firstPDCCH-Monitoring OccasionOfPO  SEQUENCE (SIZE (1.. maxNrofPOsInPF)) OF INTEGER (0 .. maxPDCCH-MonitoringOccasion)<br>}<br>-- TAG-DOWNLINK-CONFIG-COMMON-SIB-STOP<br>-- ASN1STOP |
| DownlinkConfigCommon field descriptions |
| \* \* \* |
| *firstPDCCH-MonitoringOccasionOfPO*<br>Points out the first PDCCH monitoring occasion of each PO in the PF, see TS 38.304 [20]. |
| \* \* \* |

Figure 10
Multiplicity and Type Constraint Definitions

```
-- ASN1START
-- TAG-MULTIPLICITY-AND-TYPE-CONSTRAINT-DEFINITION-START

* * * maxNrofPCT-Ranges          INTEGER::=8      -- Maximum number of PCI Ranges
maxNnrofPOsInPF            INTEGER::=4      -- Maximum number of PSs in a PF
maxPDCCH-MonitoringOccasion INTEGER::=2239  -- Maximum number of PDCCH
                                               Monitoring Occasions maxNnrofCSI-RS-ResourcesRRM INTEGER::=96    -- Maximum number of CSI-RS
                                               resources
    * * *
-- TAG-MULTIPLICITY-AND-TYPE-CONSTRAINT-DEFINITION-STOP
```

Figure 11
End of NR-RRC-Definitions

```
-- ASN1START
END
-- ASN1STOP
```

PROVISION OF DISTRIBUTED PAGING OCCASIONS

CROSS-REFERENCE TO RELATED APPLICATIONS

This application is a continuation of U.S. patent application Ser. No. 17/508,011 filed on Oct. 22, 2021, which itself is a continuation of U.S. patent application Ser. No. 17/056, 832 filed on Nov. 19, 2020 (now U.S. Pat. No. 11,166,257), which is a 35 U.S.C. § 371 national stage application of PCT International Application No. PCT/EP2019/066280 filed on Jun. 19, 2019, which in turns claims domestic priority to U.S. Provisional Patent Application No. 62/688,319, filed on Jun. 21, 2018, the disclosures and content of which are incorporated by reference herein in their entirety.

TECHNICAL FIELD

The present disclosure relates generally to wireless communications and related wireless devices and network nodes, and particularly relates to paging.

BACKGROUND

An important property of the coming 5G system (e.g. NR), which is relevant also in the context of the present disclosure, is the usage of high carrier frequencies, e.g. in the range 6-100 GHz. For such high frequency spectrum, the atmospheric, penetration and diffraction attenuation properties can be much worse than for lower frequency spectrum. In addition, the receiver antenna aperture, as a metric describing the effective receiver antenna area that collects the electromagnetic energy from an incoming electromagnetic wave, is inversely proportional to the frequency, i.e., the link budget would be worse for the same link distance even in a free space scenario, if omnidirectional receive and transmit antennas are used. This motivates the usage of beamforming to compensate for the loss of link budget in high frequency spectrum. This is particularly important when communicating with UEs with poor receivers, e.g. low cost/low complexity UEs. Other means for improving the link budget include repetition of the transmissions (e.g. to allow wide beam or omnidirectional transmission) or use of Single Frequency Network transmission from multiple TRPs in the same or different cells.

Due to the above described properties, in the high frequency bands, many downlink signals, such as synchronization signals, system information, and paging, which need to cover a certain area (i.e. not just targeting a single UE with known location/direction), e.g. a cell, are expected to be transmitted using beam sweeping, i.e. transmitting the signal in one beam at a time, sequentially changing the direction and coverage area of the beam until the entire intended coverage area, e.g. the cell, has been covered by the transmission.

The signals in NR which correspond to the PSS, SSS and PBCH (which carries the MIB) in LTE (sometimes referred to as NR-PSS, NR-SSS and NR-PBCH in NR), are put together in an entity/structure denoted SS Block (SSB) or, with other terminology, SS/PBCH block (the term SS Block is typically used in RAN2 while RAN1 usually uses the term SS/PBCH block). Hence, SS Block, SSB and SS/PBCH block are three synonyms (although SSB is really an abbreviation of SS Block). The PSS+SSS enables a UE to synchronize with the cell and also carries information from which the Physical Cell Identity (PCI) can be derived. The PBCH part of the SSB carries a part of the system information denoted MIB (Master Information Block) or NR-MIB. In high frequencies, SS Blocks will be transmitted periodically using beam sweeping. Multiple such beamformed SS Block transmissions are grouped into a SS Burst and one or more SS Bursts constitute a SS Burst Set, where the SS Burst Set constitutes a full beam sweep of SS Block transmissions. RAN1, RAN2, RAN3, and RAN4 are 3GPP working groups, more formally referred to as TSG-RAN WG1, TSG-RAN WG2, TSG-RAN WG3, and TSG-RAN WG4.

In NR, the system information (SI) is divided into the two main parts "Minimum SI" (MSI) and "Other SI" (OSI). The MSI is always periodically broadcast, whereas the OSI may be periodically broadcast or may be available on-demand (and different parts of the OSI may be treated differently). The MSI consists of the MIB and System Information Block type 1 (SIB1), where SIB1 is also referred to as Remaining Minimum System Information (RMSI) (the term SIB1 is typically used by RAN while RAN1 usually uses the term RMSI). SIB1/RMSI is periodically broadcast using a PDCCH/PDSCH-like channel structure, i.e. with a scheduling allocation transmitted on the PDCCH (or NR-PDCCH), allocating transmission resources on the PDSCH (or NR-PDSCH), where the actual RMSI is transmitted. The MIB contains information that allows a UE to find and decode RMSI/SIB1. More specifically, configuration parameters for the PDCCH utilized for the RMSI/SIB1 is provided in the MIB, possibly complemented by parameters derived from the PCI. If this configuration information is absent in the MIB, then a default configuration specified in 3GPP TS 38.213 is used. A further 3GPP agreement for release 15 concerning RMSI transmission is that the RMSI/SIB1 transmissions should be spatially Quasi Co-Located (QCL) with the SS Block transmissions. A consequence of the QCL property is that the PSS/SSS transmission can be relied on for accurate synchronization to be used when receiving the PDCCH/PDSCH carrying the RMSI/SIB1.

Paging and OSI are also transmitted using the PDCCH+PDSCH principle with PDSCH DL scheduling allocation on the PDCCH and Paging message or SI message on the PDSCH. An exception to this is that paging information may optionally be conveyed in the paging DCI on the PDCCH, thus skipping the Paging message on the PDSCH. For release 15, this has been agreed to be used when paging is used for notification of ETWS, CMAS or SI update. For future releases, it is possible that other paging cases may utilize this PDCCH only transmission mechanism. The configuration information for the PDCCH used for paging and the PDCCH used for OSI transmission is included in the RMSI/SIB1. For both paging and OSI, the same CORESET is used as for RMSI/SIB1. In the RMSI/SIB1 (as specified in 3GPP TS 38.331), the search space (i.e. the time windows and time repetition pattern) for paging is indicated in the pagingSearchSpace parameter (which corresponds to the paging-SearchSpace parameter in 3GPP TS 38.213) while the OSI search space is indicated in the searchSpaceOtherSystemInformation parameter (which corresponds to the osi-SearchSpace parameter in 3GPP TS 38.213). If the configuration information for the PDCCH for paging is absent in the RMSI/SIB1 (i.e. if the pagingSearchSpace parameter is not present in the RMSI/SIB1), then the monitoring windows/monitoring occasions for the PDCCH (i.e. essentially the search space) are the same as those configured for RMSI/SIB1.

Note that the pagingSearchSpace parameter contains a SearchSpaceId, which points out a set of parameters which constitute a PDCCH search space configuration. This complexity is henceforth overlooked herein and the term paging-SearchSpace is henceforth used to refer to the set of parameters that configure the PDCCH search space for paging.

Paging is an essential function in a mobile telecommunications system. It is used to let the network contact a UE while in RRC_IDLE or RRC_INACTIVE (see further below) state, primarily in order to transmit downlink data to the UE, once the UE has responded to the page. Paging can also be used to inform UEs of updates of the system information in a cell. It can also be used for informing UEs of an ongoing public warning such as ETWS or CMAS.

In LTE, a UE in RRC_IDLE state camps on a cell and while camping monitors the paging channel associated with that cell. The UE is configured to monitor repeatedly occurring paging occasions and may reside in a DRX sleep mode in between the paging occasions. When the UE is paged at such a paging occasion, the paging is indicated on the PDCCH in the form of a DL scheduling allocation addressed to the P-RNTI (which is shared by all UEs). This DL scheduling allocation indicates the DL transmission resources on the PDSCH, where the actual paging message is transmitted. A UE in RRC_IDLE state, which receives a DL scheduling allocation addressed to the P-RNTI at one of the UE's paging occasions, receives and reads the paging message from the allocated DL transmission resources to find out whether the paging message is intended for the UE. The UE(s) that is(are) subject to the paging is(are) indicated in the paging message through one or more UE paging identifiers (S-TMSI or IMSI), wherein each UE paging identifier is included in a paging record. Up to 16 UEs may be addressed, i.e. there may be up to 16 paging records in one paging message.

Most of these paging principles and mechanisms are reused in NR. However, in NR a new state is introduced, denoted RRC_INACTIVE state, for which paging is also relevant. 3GPP has decided to specify a similar RRC_INACTIVE state for LTE, but this has not been done yet. The purpose of introducing the RRC_INACTIVE state in addition to the RRC_IDLE state is to introduce a low-energy state with reduced signalling overhead over the radio and network interfaces and improved UE access latency as well as UE energy consumption when the UE moves from an energy saving state to a state designed for transmission and reception of user data (i.e. RRC_CONNECTED state). In this state, the core network still regards the UE as connected and thus the RAN-CN connection is kept active, while the RRC connection between the gNB and the UE is released. The UE's RAN context is maintained in the anchor gNB and the RAN-CN connection is maintained between the anchor gNB and the core network. In order to reduce radio interface signalling at connection establishment, the context information is kept active in the UE and in the anchor gNB which enables the UE to resume the RRC connection when it is paged from the RAN or has UL data or signalling to send. In this state, the UE can move around in a RAN Notification Area (RNA) without informing the network of its whereabouts, but as soon as it leaves its configured RNA, it informs the network. In NR, paging can thus be used for a UE in either RRC_IDLE state or RRC_INACTIVE state. In RRC_IDLE state, the paging is initiated by the CN, while paging of a UE in RRC_INACTIVE state is initiated by the RAN (the anchor gNB). A UE in RRC_INACTIVE state must be prepared to receive paging initiated by either the RAN or the CN. Normally, paging of a UE in RRC_INACTIVE state is initiated by the RAN, but in cases of state mismatch between the UE and the CN, the CN may initiate paging of a UE that considers itself to be in RRC_INACTIVE state.

For CN initiated paging, the UE ID used in the Paging message is the 5G-S-TMSI in NR (replacing the S-TMSI that is used in LTE). The IMSI is used only in rare error cases where the 5G-S-TMSI is not available. For RAN initiated paging, the UE ID used in the Paging message is the I-RNTI (which is assigned by the anchor gNB). The same Paging message is used over the radio interface for both CN initiated and RAN initiated paging, so the type of UE ID is what informs the UE of whether the CN or the RAN initiated the page. The UE needs to know this since it is expected to act differently depending on which entity that initiated the page. In response to CN initiated paging (excluding ETWS/CMAS/SI update notification) the UE is expected to contact the network (through random access) and request establishment of a new RRC connection (including a NAS Service Request message). I response to RAN initiated paging (excluding ETWS/CMAS/SI update notification) the UE is expected to contact the network (through random access) and request to resume an existing (suspended) RRC connection. Another possible difference between LTE and NR is that the maximum number of UE IDs that may be included in a Paging message may be increased from 16 in LTE to a greater number, e.g. 32, in NR. However, as indicated, at this point there is no agreement in 3GPP to increase the maximum number of UE IDs in the Paging message.

As mentioned above, in NR, paging has to be transmitted using beamforming transmission on high carrier frequencies, e.g. multi-GHz frequencies, especially on really high frequencies, such as frequencies above 20 GHz and hence beam sweeping has to be used to cover an entire cell with the page. To support beam sweeping of paging transmissions, a paging occasion (PO) in NR can consist of multiple timeslots to accommodate all the paging transmissions of the beam sweep. This is configured in the system information.

A paging occasion is thus a regularly recurring time window during which paging may be transmitted. Different UEs can be allocated to different POs and a UE is expected to monitor the paging channel (i.e. the PDCCH configured for paging) during its allocated PO. A radio frame that contains one or more PO(s) is denoted Paging Frame (PF).

In both LTE and NR, the time interval between two POs for a certain UE is governed by a paging DRX cycle (henceforth referred to as "DRX cycle"), i.e. there is one PO allocated to the UE during each DRX cycle (the UE is aware of all POs, but "selects" one based on its UE ID). Unless the UE is configured with an extended DRX (eDRX) cycle, the DRX cycle a UE uses is the shortest of the default DRX cycle (also referred to as the default paging cycle), which is announced in the system information (then denoted defaultPagingCycle), or a UE specific DRX cycle negotiated with the CN. For regular UEs (i.e. UEs which are not configured with any type of extended DRX (eDRX) cycle), the shortest of the default DRX cycle and the UE specific DRX cycle (if available) is used. In NR, a UE can also be configured with a DRX cycle to be used in RRC_INACTIVE state. This DRX cycle is assigned to the UE when the UE is moved to RRC_INACTIVE state.

Within the DRX cycle, a UE calculates a PF and which out of possibly multiple (1, 2 or 4 in LTE) PO(s) in the PF it should monitor based on its UE ID. In LTE, IMSI mod 1024 is used for this calculation and this has also been agreed for NR. However, due to security/privacy issues related to the use of the IMSI for this purpose, it is likely that the agreement for NR will be changed and the IMSI will be replaced by the 5G-S-TMSI in this formula.

In LTE the PFs for a UE are the radio frames with System Frame Numbers (SFN) satisfying the following equation:

$$SFN \bmod T = (T \operatorname{div} N)*(UE\_ID \bmod N)$$

Where ...
T: DRX cycle (default or UE specific)
N: min(T, nB) (I.e., N is the number of PFs in a DRX cycle.)
nB: e.g. 4T, 2T, T, T/2, T/4, T/8, T/16, T/32, T/64, T/128, T/256 (the number of POs in a DRX cycle)
UE_ID: IMSI mod 1024

This formula will probably be reused in NR, possibly with some modification. One proposed modification is to introduce an offset for shifting of PFs, which would result in the following slightly modified formula for PF calculation (with the definitions of T, N, nB and UE_ID unchanged):

$$(SFN+PF\_\text{offset}) \bmod T = (T \operatorname{div} N)*(UE\_ID \bmod N)$$

Within a PF, the PO(s) is/are configured/allocated based on a table in LTE, where the UE ID determines which of the PO(s) a UE should monitor. In detail, this LTE algorithm may be provided as discussed below.

The subframe, which constitutes a UE's PO within a PF is determined by the table of FIG. 5. The parameters in the table of FIG. 5 are:
Ns: max(1, nB/T) (I.e., Ns is the number of POs in a PF.)
i_s: floor(UE ID/N) mod Ns (i_s is an index pointing out a certain UE's PO within a PF.)

As can be understood from the above algorithm and the table of FIG. 5, i_s is an index that points out which of the PO(s) in a PF a UE should use, wherein the PO(s) are indexed (i.e. i_s has the range) from 0 to Ns−1. The table of FIG. 5 determines the allocation of PO(s) to subframe(s) within a PF.

The above is thus the LTE algorithm for configuration of POs in a PF, which is also the baseline for NR, but as will be explained further below, this algorithm is not fully suitable for NR and will not be reused in its entirety in NR.

In the context of the disclosure herein, it is also relevant to describe a difference in the time domain structure of L1 of the radio interface between LTE and NR. While LTE always has the same structure, NR has different structures, because it comprises different so-called numerologies (which essentially can be translated to different subcarrier spacings (SCSs) and consequent differences in the time domain, e.g. the length of an OFDM symbol). In LTE, the L1 radio interface time domain structure consists of symbols, subframes and radio frames, where a 1 ms subframe consists of 14 symbols (12 if extended cyclic prefix is used) and 10 subframes form a 10 ms radio frame. In NR, the concepts of subframes and radio frames are reused in the sense that they represent the same time periods, i.e. 1 ms and 10 ms respectively, but their internal structures vary depending on the numerology. For this reason, the additional term "slot" is introduced in NR, which is a time domain structure that always contains 14 symbols, irrespective of the symbol length. Hence, the number of slots and symbols comprised in a subframe and a radio frame vary with the numerology, but the number of symbols in a slot remains consistent. The numerologies and parameters are chosen such that a subframe always contains an integer number of slots (i.e. no partial slots). Note that the choice of the term "slot" to refer to a set of 14 OFDM symbols in NR is somewhat unfortunate, since the term "slot" also exists in LTE, although in LTE it refers to half a subframe, i.e. 0.5 ms containing 7 OFDM symbols (or 6 OFDM symbols in when extended cyclic prefix is used).

Returning to the PO allocation, the table-based configuration/allocation used in LTE cannot be readily reused in NR. In LTE it was simple to map a PO to a subframe and this could easily be done through the table specified for this purpose. However, in NR a PO cannot simply be mapped to a subframe. In terms of transmission resources, a subframe is an unambiguous concept in LTE (with the only variation being normal or extended cyclic prefix). In NR, on the other hand, the transmission resources (in terms of slots and hence OFDM symbols) vary with different numerologies (i.e. subcarrier spacings, SCSs). In addition, the duration required for a PO in NR is variable and depends the number of beams needed in a possible beam sweep for the PDCCH for paging in combination with the SCS and consequent symbol length. For these reasons, the table-based PO configuration mechanism of LTE has been replaced by a mechanism based on the paging-SearchSpace in NR. The Ns and i_s parameters are retained, but they no longer point out subframes in a paging frame, but rather sets of PDCCH monitoring occasions (constituting PDCCH beam sweeps) in a PF.

In NR, two main cases are distinguished: the so-called default case and the non-default case. This refers to whether there is an explicit paging-SearchSpace parameter structure configured through the system information. If no such paging-SearchSpace parameter structure is included in the system information (i.e. if there is no pagingSearchSpace parameter in the RMSI/SIB1), a default allocation of the PO(s) within a PF is used. That is, in the default case, the PDCCH monitoring occasions corresponding to the PO(s) within a PF are determined according to a default association in relation to the SSB transmissions and these PDCCH monitoring occasions are then the same as for the RMSI as defined in section 13 in 3GPP TS 38.213. For the default case there can be 1 or 2 PO(s) in a PF (i.e. Ns can be equal to 1 or 2). If there are 2 POs in the PF, there is one PO in the first half frame (corresponding to i_s=0) and one PO in the second half frame (corresponding to i_s=1).

For the non-default case (i.e. with the paging-SearchSpace explicitly configured and the paging-SearchSpace parameter included in the RMSI/SIB1) a different approach is suggested in R2-1807689 W. Here it is proposed (the essence of which is adopted in the text currently proposed for TS 38.304) to utilize the paging-SearchSpace parameter structure (i.e. the parameters pointed out by the SearchSpaceId of the pagingSearchSpace parameter) to define POs within a PF. The paging-SearchSpace configures a time domain pattern for so-called PDCCH monitoring occasions, at which a UE should monitor the PDCCH for paging transmissions (i.e. a DCI with a CRC scrambled with the P-RNTI) in the Control Resource Set (CORESET) configured for paging. The paging-SearchSpace contains the following parameters that define the time domain pattern for the PDCCH monitoring occasions:

Monitoring-periodicity-PDCCH-slot
Monitoring-offset-PDCCH-slot
Monitoring-symbols-PDCCH-within-slot Note that the parameter names Monitoring-periodicity-PDCCH-slot, Monitoring-offset-PDCCH-slot and Monitoring-symbols-PDCCH-within-slot are used in 3GPP TS 38.213. In 3GPP TS 38.331, the Monitoring-periodicity-PDCCH-slot and Monitoring-offset-PDCCH-slot are merged into a single corresponding parameter structure called monitoringSlotPeriodicityAndOffset and the parameter corresponding to the Monitoring-symbols-PDCCH-within-slot parameter is called monitoringSymbolsWithinSlot. These parameters have the ASN.1 specifications in 3GPP TS 38.331 illustrated in FIG. 6.

The CORESET indicates the DL transmission resources a UE should monitor during a PDCCH monitoring occasion. More specifically, a CORESET indicates a set of PRBs in the frequency domain and 1-4 consecutive OFDM symbols in the time domain. The length of a PDCCH monitoring occasion is thus defined by the length (number of OFDM symbols) of the CORESET. For instance, if the length of the CORESET is 3 symbols and the Monitoring-symbols-PDCCH-within-slot parameter (which is a bitmap) indicates that 6 consecutive symbols (or two groups of three consecutive symbols with one or more symbols between the groups) should be monitored, then these 6 symbols constitute 2 PDCCH monitoring occasions.

The proposal in R2-1807689 [1] is that each paging beam transmission matches one PDCCH monitoring occasion, as defined by the paging-SearchSpace and that, assuming $N_{beams}$ beams, the first $N_{beams}$ PDCCH monitoring occasions in the PF constitute the first PO in the PF, the subsequent $N_{beams}$ PDCCH monitoring occasions in the PF constitute the second PO in the PF, etc.

The proposal in R2-1807689 [1] has to some extent been captured in the likely to be agreed text related to paging in the current draft of 3GPP TS 38.304 for 3GPP release 15. However, there is still room for modifications and additions.

The following (indented text) is a copy of the current (expected to be agreed) text in section 7.1 "Discontinuous Reception for Paging" in 3GPP TS 38.304:

The UE may use Discontinuous Reception (DRX) in RRC_IDLE and RRC_INACTIVE state in order to reduce power consumption. The UE monitors one paging occasion (PO) per DRX cycle. A PO is a set of PDCCH monitoring occasions and can consist of multiple time slots (e.g. subframe or OFDM symbol) where paging DCI can be sent [4].

One Paging Frame (PF) is one Radio Frame and may contain one or multiple PO(s) or starting point of a PO.

In multi-beam operations, the length of one PO is one period of beam sweeping and the UE can assume that the same paging message is repeated in all beams of the sweeping pattern and thus the selection of the beam(s) for the reception of the paging message is up to UE implementation. The paging message is same for both RAN initiated paging and CN initiated paging.

The UE initiates RRC Connection Resume procedure upon receiving RAN paging. If the UE receives a CN initiated paging in RRC_INACTIVE state, the UE moves to RRC_IDLE and informs NAS.

PF, PO are determined by the following formulae:
SFN for the PF is determined by:

$(SFN+PF\_offset) \mod T = (T \div N)*(UE\_ID \mod N)$

Index (i_s), indicating the start of a set of PDCCH monitoring occasions for the paging DCI, is determined by:

$i\_s = \text{floor}(UE\_ID/N) \mod Ns$; where, $Ns = \max(1, nB/T)$

The PDCCH monitoring occasions for paging are determined according to paging-SearchSpace if configured and according to the default association (i.e. PDCCH monitoring occasions for paging are same as for RMSI as defined in Section 13 in [4]) otherwise.

For default association, Ns is either 1 or 2. For Ns=1, there is only one PO which starts in the PF. For Ns=2, PO is either in the first half frame (i_s=0) or the second half frame (i_s=1) of the PF.

For non-default association (i.e. when paging-SearchSpace is used), the UE monitors the (i_s+1)th PO where the first PO starts in the PF.

The following parameters are used for the calculation of PF and i_s above:

T: DRX cycle of the UE (T is determined by the shortest of the UE specific DRX value, if configured by RRC or upper layers, and a default DRX value broadcast in system information. If UE specific DRX is not configured by upper layers, the default value is applied)

nB: number of total paging occasions in T

N: min(T,nB)

PF_offset: offset used for PF determination

UE_ID: IMSI mod 1024

Parameters nB, PF_offset, and the length of default DRX Cycle are signaled in SystemInformationBlock1.

If the UE has no IMSI, for instance when making an emergency call without USIM, the UE shall use as default identity UE_ID=0 in the PF and i_s formulas above.

IMSI is given as sequence of digits of type Integer (0 . . . 9). IMSI shall in the formulae above be interpreted as a decimal integer number, where the first digit given in the sequence represents the highest order digit. For example:

IMSI=12(digit1=1,digit2=2)

In the calculations, this shall be interpreted as the decimal integer "12", not "1×16+2=18".

Known methods for paging, however, may be too rigid and/or may not provide sufficient paging capacity for some NR scenarios.

SUMMARY

According to some embodiments of inventive concepts, a method may be provided to operate a base station of a wireless communication network. Parameters are generated that define a plurality of potential PDCCH monitoring occasions and that define a plurality of paging occasions, wherein each one of the plurality of paging occasions includes a respective subset of the plurality of potential PDCCH monitoring occasions, wherein consecutive paging occasions are spaced apart in time with at least one of the potential PDCCH monitoring occasions therebetween not being included in any of the plurality of paging occasions. The parameters are transmitted over a radio interface to a wireless device.

According to some other embodiments of inventive concepts, a method may be provided to operate a base station of a wireless communication network. Parameters are generated that define a plurality of potential PDCCH monitoring occasions distributed over a paging frame and that define at least one paging occasion, wherein the at least one paging occasion includes a subset of the plurality of potential PDCCH monitoring occasions, wherein at least one of the plurality of potential PDCCH monitoring occasions is between a beginning of the paging frame and the at least one paging occasion, and the at least one of the plurality of potential PDCCH monitoring occasions is not included in any paging occasion of the paging frame. The parameters are transmitted over a radio interface to a wireless device.

According to still other embodiments of inventive concepts, a method may be provided to operate a wireless device in a wireless communication network. Parameters are received that define a plurality of potential PDCCH monitoring occasions and that define a plurality of paging occasions, wherein each one of the plurality of paging occasions includes a respective subset of the plurality of potential PDCCH monitoring occasions, wherein consecutive paging occasions are spaced apart in time with at least one of the potential PDCCH monitoring occasions therebetween not being included in any of the plurality of paging occasions. The wireless device monitors for paging messages based on the parameters that define the plurality of potential PDCCH monitoring occasions and the plurality of paging occasions.

According to yet other embodiments of inventive concepts, a method may be provided to operating a wireless device in a wireless communication network. Parameters are received that define a plurality of potential PDCCH monitoring occasions distributed over a paging frame and that define at least one paging occasion, wherein the at least one paging occasion includes a subset of the plurality of potential PDCCH monitoring occasions, wherein at least one of the plurality of potential PDCCH monitoring occasions is between a beginning of the paging frame and the at least one paging occasion, and wherein the at least one of the plurality of potential PDCCH monitoring occasions is not included in any paging occasion of the paging frame. The wireless device monitors for paging messages based on the parameters that define the plurality of potential PDCCH monitoring occasions and the at least one paging occasion.

According to some embodiments of inventive concepts, paging occasions may be more evenly distributed over a paging frame thereby reducing load peaks and/or other issues relating to TDD operation.

BRIEF DESCRIPTION OF THE DRAWINGS

The accompanying drawings (herein and attached), which are included to provide a further understanding of the disclosure and are incorporated in a constitute a part of this application, illustrate certain non-limiting embodiments of inventive concepts.

FIG. 5 illustrates a table used to determine a UE's paging occasion within a paging frame;

FIG. 6 illustrates parameters from 3GPP TS 38.331;

FIG. 7 illustrates methods to configure PDCCH monitoring occasion "bursts" forming paging occasions within a paging frame according to some embodiments of inventive concepts;

FIG. 9 illustrates elements of the Information Element IE DownlinConfigCommon according to some embodiments of inventive concepts;

FIGS. 10 and 11 illustrate elements of RRC multiplicity and type constraint values/definitions according to some embodiments of inventive concepts;

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

Figure 1:
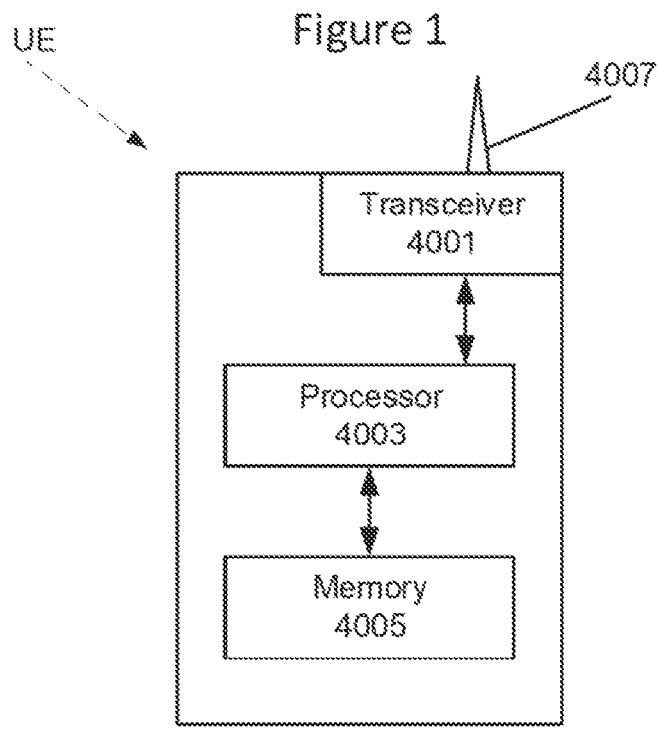
FIG. 1 is a block diagram illustrating a wireless device according to some embodiments of inventive concepts.

FIG. 1 is a block diagram illustrating elements of a wireless device UE (also referred to as a wireless terminal, a wireless communication device, a wireless communication terminal, user equipment, UE, a user equipment node/terminal/device, etc.) configured to provide wireless communication according to embodiments of inventive concepts. As shown, wireless device UE may include an antenna 4007, and a transceiver circuit 4001 (also referred to as a transceiver) including a transmitter and a receiver configured to provide uplink and downlink radio communications with a base station gNB of a wireless communication network (also referred to as a radio access network RAN). Wireless device UE may also include a processor circuit 4003 (also referred to as a processor) coupled to the transceiver circuit, and a memory circuit 4005 (also referred to as memory) coupled to the processor circuit. The memory circuit 4005 may include computer readable program code that when executed by the processor circuit 4003 causes the processor circuit to perform operations according to embodiments disclosed herein. According to other embodiments, processor circuit 4003 may be defined to include memory so that a separate memory circuit is not required. Wireless device UE may also include an interface (such as a user interface) coupled with processor 4003, and/or wireless device UE may be an IoT and/or MTC device.

As discussed herein, operations of wireless device UE may be performed by processor 4003 and/or transceiver 4001. For example, processor 4003 may control transceiver 4001 to transmit uplink communications through transceiver 4001 over a radio interface to a base station gNB of a wireless communication network and/or to receive downlink communications through transceiver 4001 from a base station gNB of the wireless communication network over a radio interface. Moreover, modules may be stored in memory 4005, and these modules may provide instructions so that when instructions of a module are executed by processor 4003, processor 4003 performs respective operations (e.g., operations discussed below with respect to Example Embodiments).

Figure 2:
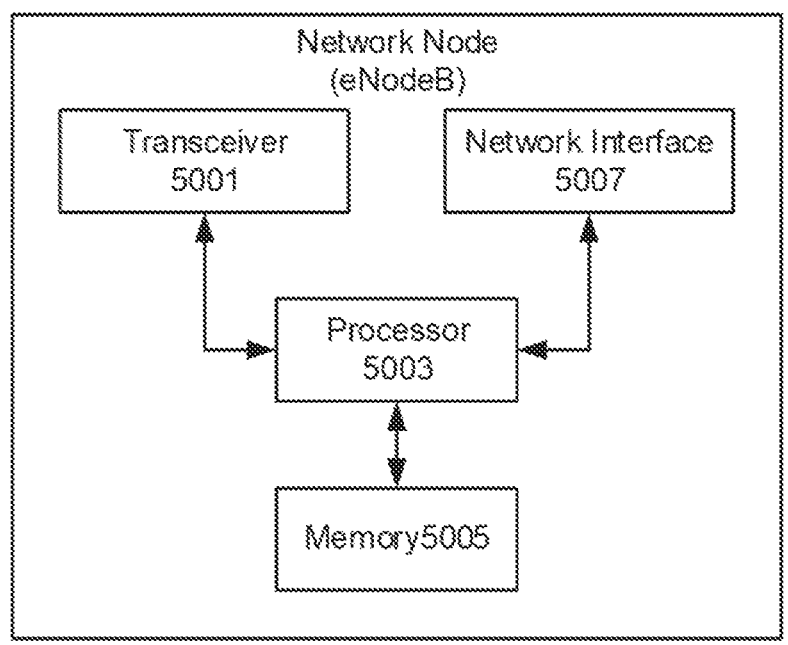
FIG. 2 is a block diagram illustrating a radio access network RAN node according to some embodiments of inventive concepts.

FIG. 2 is a block diagram illustrating elements of a network node (also referred to as a network node, base station, gNB, gNodeB, etc.) of a wireless communication network (also referred to as a Radio Access Network RAN) configured to provide cellular communication according to embodiments of inventive concepts. As shown, the network node may include a transceiver circuit 5001 (also referred to as a transceiver) including a transmitter and a receiver configured to provide uplink and downlink radio communications with wireless devices. The network node may include a network interface circuit 5007 (also referred to as a network interface) configured to provide communications with other nodes (e.g., with other base stations and/or core network nodes) of the RAN. The network node may also include a processor circuit 5003 (also referred to as a processor) coupled to the transceiver circuit, and a memory circuit 5005 (also referred to as memory) coupled to the processor circuit. The memory circuit 5005 may include computer readable program code that when executed by the processor circuit 5003 causes the processor circuit to perform operations according to embodiments disclosed herein. According to other embodiments, processor circuit 5003 may be defined to include memory so that a separate memory circuit is not required.

As discussed herein, operations of the network node may be performed by processor 5003, network interface 5007, and/or transceiver 5001. For example, processor 5003 may control transceiver 5001 to transmit downlink communications through transceiver 5001 over a radio interface to one or more UEs and/or to receive uplink communications through transceiver 5001 from one or more UEs over a radio interface. Similarly, processor 5003 may control network interface 5007 to transmit communications through network interface 5007 to one or more other network nodes and/or to receive communications through network interface from one or more other network nodes. Moreover, modules may be stored in memory 5005, and these modules may provide instructions so that when instructions of a module are executed by processor 5003, processor 5003 performs respective operations (e.g., operations discussed below with respect to Example Embodiments).

The above described default case (i.e. where the PDCCH monitoring occasions for POs are the same as for the RMSI) may have associated problems in that it may be too rigid and may not provide enough paging capacity for the really demanding scenarios (i.e. it is not on par with LTE). Any problem with the default case may however be overcome by using explicit configuration, i.e. the non-default case. Hence, problems may be associated with the non-default case.

As mentioned above, the table-based configuration/allocation of POs within a PF, as used in LTE, cannot be readily reused in NR, because the variable length beam sweeping (i.e. configurable number of beams and numerology-dependent OFDM slot duration) of the PDCCH for paging, as well as the presence of different numerologies (i.e. different SCSs resulting in different number of symbols and slots in a subframe and in a radio frame) does not match the mechanism used in LTE. In LTE it may be relatively simple to map a PO to a subframe and this could be done through the table specified for this purpose. However, in NR a PO cannot simply be mapped to a subframe. In terms of transmission resources, a subframe is an unambiguous concept in LTE (with the only variation being normal or extended cyclic prefix). In NR, on the other hand, the transmission resources (in terms of slots and hence OFDM symbols) vary with different numerologies (i.e. subcarrier spacings, SCSs). In addition, the duration required for a PO in NR is variable and depends the number of beams needed in a possible beam sweep for the PDCCH for paging in combination with the SCS and consequent symbol length.

The alternative proposal for PO allocation within a PF as elaborated in R2-1807689 [1] may also suffer from problems. When a PO spans across a slot border (which is inevitable when the PDCCH beam sweep requires more than 14 OFDM symbols), the proposed way to let the PDCCH monitoring occasions form POs makes the POs be lumped back to back instead of being evenly distributed in the PF, thus potentially creating load peaks in the DL signaling as well as on the PRACH resources and other access resources in the network. This is because the paging-SearchSpace parameters do not allow configuration of "bursts" of PDCCH monitoring occasions with gaps between the bursts, unless each burst of PDCCH monitoring occasions can be accommodated in a single slot (which is clearly not the case for paging, where up to 64 beams may be used), which can then be repeated with the Monitoring-periodicity-PDCCH-slot parameter, e.g. with empty slots inserted in between the PO slots. When a burst (representing PO) crosses a slot border, these two slots both have to have at least one PDCCH monitoring occasion and since there is only one parameter for the time pattern of PDCCH monitoring occasions within a slot, i.e. Monitoring-symbols-PDCCH-within-slot, the same pattern has to be repeated in the two slots. A further consequence is then that the Monitoring-periodicity-PDCCH-slot parameter has to be set to 1, resulting in that the same PDCCH monitoring occasion pattern is repeated in every slot in the PF. Hence, POs, i.e. groups/bursts of PDCCH monitoring occasions extending across a slot border (which is inevitable when the PDCCH beam sweep requires more than 14 OFDM symbols) can only be configured in the form of a continuous stream of dense PDCCH monitoring occasions, i.e. effectively back to back bursts.

If, in an attempt to avoid lumping of POs, the PDCCH monitoring occasions are configured in a way that the POs are spread (still back to back) in time to fill up the PF as well as possible, e.g. by distributing the PDCCH monitoring occasions in a sparse time domain pattern, this will result in unnecessarily long POs, due to unnecessarily scarce PDCCH monitoring occasions (and consequent lack of gaps between the POs), which will potentially increase the energy consumption in the UEs. Furthermore, even with such PDCCH monitoring occasion configuration, lumping cannot be fully avoided, unless the number of PDCCH monitoring occasions in the PF is equal to the number of paging beams multiplied by the number of POs in the PF. Such matching is however not feasible for most of the possible configurations, because the PDCCH monitoring occasion configuration has limited flexibility (e.g. the same symbol pattern has to appear in all the repetitive slots), while the number of beams used for paging (and SS Blocks) is fully flexibly configurable between 1 and a maximum number, L, determined by the carrier frequency, where L=4 for frequencies up to 3 GHz, L=8 for frequencies between 3 GHz and 6 GHz and L=64 for frequencies between 6 GHz and 52.6 GHz.

Yet another problematic aspect is that both back to back lumping of POs and filling up the PF with POs consisting of sparse PDCCH monitoring occasions may be detrimental to TDD operation, since it may prevent efficient TDD UL operation during too long continuous time intervals.

To address issues associated with the non-default case and the proposal in R2-1807689 [1] that POs crossing a slot boundary cannot be evenly distributed with gaps in between within a PF, it is proposed to complement, or augment, the regular paging-SearchSpace parameters with an additional parameter (containing one value per time-multiplexed PO in a PF), which determines which of the PDCCH monitoring occasions indicated by the regular paging-SearchSpace parameters that will actually be used for POs. That is, the configuration of the PDCCH monitoring occasions that constitute the POs could be described as a two-step process, where the regular paging-SearchSpace parameters indicate a potentially large set of potential PDCCH monitoring occasions in a first step, which in a second step—using the new parameter (with one value per PO)—are restricted to one or more subset(s) of the potential PDCCH monitoring occasions, resulting in the finally configured PDCCH monitoring occasions forming one or more group(s) or "burst(s)" of monitoring occasions, wherein each such group/burst represents a PO.

In a preferred embodiment, the regular paging-SearchSpace parameters indicate a large set of dense potential PDCCH monitoring occasions, from which the new parameter selects one or more dense group(s)/burst(s) of PDCCH monitoring occasions with gaps between the groups/bursts (when there is more than one group/burst), so that the POs mapped on the groups/bursts of PDCCH monitoring occasions are short and relatively evenly distributed in the PF.

Some embodiments may enable paging occasions to be evenly distributed in a paging frame, thus avoiding undesirable load peaks and potential problems in conjunction with TDD operation.

First embodiments of inventive concepts are discussed below.

To address issues associated with the non-default case and the proposal in R2-1807689 [1] that POs crossing a slot boundary cannot be evenly distributed with gaps in between within a PF, an approach is proposed, where a dense sequence of potential PDCCH monitoring occasions is indicated by the regular paging-SearchSpace parameters (i.e. Monitoring-periodicity-PDCCH-slot, Monitoring-offset-PDCCH-slot and Monitoring-symbols-PDCCH-within-slot) and an additional parameter is introduced to point out which of these potential PDCCH monitoring occasions should actually be used as PDCCH monitoring occasions and thus configured as POs. The significance of the qualifying word "potential" is that only a subset of the potential PDCCH monitoring occasions indicated by the regular paging-SearchSpace parameters will eventually be configured as PDCCH monitoring occasions, as indicated by the additional parameter (e.g. combined with the number of beams used for paging transmissions).

Preferably, the new parameter would point out one of the (densely) configured potential PDCCH monitoring occasions to form the first PDCCH monitoring occasion in the burst of PDCCH monitoring occasions forming a PO and the number of PDCCH monitoring occasions in the burst is defined by the number of beams used for paging transmissions. I.e. the new parameter (e.g. combined with the number of beams used for paging transmissions) restricts the set of potential PDCCH monitoring occasions to one or more "burst(s)" of PDCCH monitoring occasions. The remaining transmission resources indicated by the regular paging-SearchSpace parameters (the ones of the potential PDCCH monitoring occasions that did not end up as actually configured PDCCH monitoring occasions and which are not part of any PO) are thus not considered to be part of the search space configuration and are ignored by page monitoring UEs. The network is free to use the DL transmission resources corresponding to these unused potential PDCCH monitoring occasions for any other purposes, including use for TDD uplink operation.

The new parameter could for instance be called "First-PDCCH-monitoring-occasion-of-PO" in TS 38.304, corresponding to "firstPDCCH-MonitoringOccasionOfPO" in TS 38.331. The First-PDCCH-monitoring-occasion-of-PO parameter could be a part of the paging-SearchSpace or it could be a separate parameter. In terms of the ASN1 code in TS 8.331, it would also fit well in the PCCH-Config 1E. The parameter could appear in multiple instances, since there may be multiple POs in a PF. The parameter would hence be a multi-value parameter, e.g. a sequence of integer values. In ASN.1 code, this could for example be:

firstPDCCH-MonitoringOccasionOfPO::=
SEQUENCE (1 . . . maxNumOfPOsInPF) OF INTEGER (0 . . . max-PDCCH-MonitoringOccasion)

In the above ASN.1 example the potential PDCCH monitoring occasions as indicated by the regular paging-SearchSpace parameters are numbered 0 to max-PDCCH-MonitoringOccasion, but they could also be numbered 1 to maxNumOf-PDCCH-MonitoringOccasionsInFrame (where maxNumOf-PDCCH-MonitoringOccasionsInFrame=max-PDCCH-MonitoringOccasion+1). And instead of using max-PDCCH-MonitoringOccasion (or maxNumOf-PDCCH-MonitoringOccasionsInFrame) to define the value range, one could simply use the maximum number of OFDM symbols in a radio frame, i.e. 2240 in a system with 240 kHz subcarrier spacing. Then the ASN.1 example becomes:

firstPDCCH-MonitoringOccasionOfPO::=
SEQUENCE (1 . . . maxNumOfPOsInPF) OF INTEGER (0 . . . 2239)

Principles of some embodiments are illustrated in an example in FIG. 1. In this example, the values used for relevant parameters are the following:

Carrier frequency: <3 GHz
Subcarrier spacing: 30 kHz (□ slot duration: 500 □s □ 20 slots in a radio frame)
CORESET length: 2 OFDM symbols
Number of beams: 4
nB: 2T (i.e. 2 POs per PF)
Monitoring-periodicity-PDCCH-slot: 1
Monitoring-offset-PDCCH-slot: 0

Monitoring-symbols-PDCCH-within-slot:
  11001100110000
First-PDCCH-monitoring-occasion-of-PO: 3 (for PO 1), 33 (for PO 2)

Note that setting Monitoring-periodicity-PDCCH-slot=1 and Monitoring-offset-PDCCH-slot=0 means that the corresponding parameter monitoringSlotPeriodicityAndOffset contains the parameter sl1 set to a NULL value. The Monitoring-symbols-PDCCH-within-slot parameter is a 14 bits long bitmap/bit string. Each bit in this bit string represents an OFDM symbol in a slot. A bit set to one means that the OFDM slot is a potential OFDM slot to monitor. This value is assigned to the corresponding parameter monitoringSymbolsWithinSlot.

FIG. 7 illustrates an example of a proposed method to configure PDCCH monitoring occasion "bursts" forming paging occasions within a paging frame.

Figure 8:
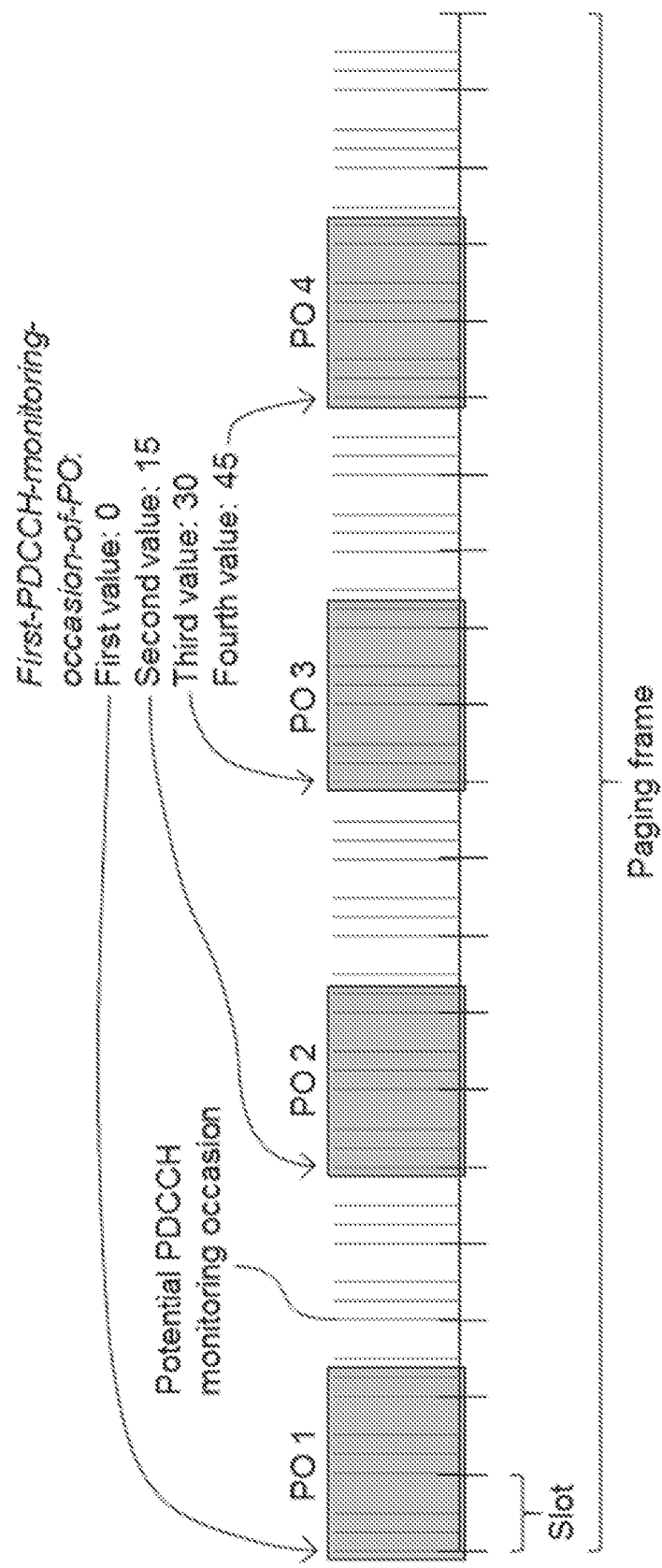
FIG. 8 illustrates methods to configure PDCCH monitoring occasion "bursts" forming paging occasions within a paging frame according to some embodiments of inventive concepts.

FIG. 8 illustrates another example with the time scale compressed to more of a bird's eye view. In this example, the values used for relevant parameters are the following:
  Carrier frequency: <6 GHz
  Subcarrier spacing: 30 kHz (⇒slot duration: 500 □s □ 20 slots in a radio frame)
  CORESET length: 2 OFDM symbols
  Number of beams: 8
  nB: 4T (i.e. 4 POs per PF)
  Monitoring-periodicity-PDCCH-slot: 1
  Monitoring-offset-PDCCH-slot: 0
  Monitoring-symbols-PDCCH-within-slot:
    11001100110000
  First-PDCCH-monitoring-occasion-of-PO:
    0 (for PO 1), 15 (for PO 2), 30 (for PO 3), 45 (for PO 4)

FIG. 8 illustrates proposed method to configure PDCCH monitoring occasion "bursts" forming paging occasions within a paging frame.

As an alternative to configuring an explicit value to indicate the start of each PO, the parameter could have the form of a first value indicating the first PDCCH monitoring occasion of the first PO and then a second value indicating the number of (potential) PDCCH monitoring occasions between two POs. For instance, if the first value is 4 and second value is 8, this means that the potential PDCCH monitoring occasion number 4 in the PF will be the first PDCCH monitoring occasion in the first PO in the PF and the second PO will start with potential PDCCH monitoring occasion number 4+8=12. If there is a third and a fourth PO in the PF, they will start at potential PDCCH monitoring occasions number 12+8=20 and 20+8=28.

Specification text examples are discussed below. Related text changes in section 7.1 in TS 38.304 could for instance be as follows:
  The UE may use Discontinuous Reception (DRX) in RRC_IDLE and RRC_INACTIVE state in order to reduce power consumption. The UE monitors one paging occasion (PO) per DRX cycle. A PO is a set of PDCCH monitoring occasions and can consist of multiple time slots (e.g. subframe or OFDM symbol) where paging DCI can be sent [4]. One Paging Frame (PF) is one Radio Frame and may contain one or multiple PO(s) or starting point of a PO.
  In multi-beam operations, the length of one PO is one period of beam sweeping and the UE can assume that the same paging message is repeated in all beams of the sweeping pattern and thus the selection of the beam(s) for the reception of the paging message is up to UE implementation. The paging message is same for both RAN initiated paging and CN initiated paging.
  The UE initiates RRC Connection Resume procedure upon receiving RAN paging. If the UE receives a CN initiated paging in RRC_INACTIVE state, the UE moves to RRC_IDLE and informs NAS.
  PF, PO are determined by the following formulae:
    SFN for the PF is determined by:

$(SFN+PF\_offset) \bmod T = (T \operatorname{div} N)*(UE\_ID \bmod N)$

Index (i_s), indicating the start of a set of PDCCH monitoring occasions for the paging DCI, is determined by:

$i\_s = \operatorname{floor}(UE\_ID/N) \bmod Ns;$ where, $Ns = \max(1, nB/T)$

The PDCCH monitoring occasions for paging are determined according to paging-SearchSpace and First-PDCCH-monitoring-occasion-of-PO if configured, combined with the number of PDCCH transmissions used per paging occasion and according to the default association (i.e. PDCCH monitoring occasions for paging are same as for RMSI as defined in Section 13 in [4]) otherwise.
  For default association, Ns is either 1 or 2. For Ns=1, there is only one PO which starts in the PF. For Ns=2, PO is either in the first half frame (i_s=0) or the second half frame (i_s=1) of the PF.
  For non-default association (i.e. when paging-SearchSpace is used), the UE monitors the (i_s+1)th PO where the first PO starts in the PF. When First-PDCCH-monitoring-occasion-of-PO is present, the UE monitors the (i_s+1)th PO where the first PDCCH monitoring occasion for each PO in the PF is indicated by the First-PDCCH-monitoring-occasion-of-PO.
  The following parameters are used for the calculation of PF and i_s above:
    T: DRX cycle of the UE (T is determined by the shortest of the UE specific DRX value, if configured by RRC or upper layers, and a default DRX value broadcast in system information. If UE specific DRX is not configured by upper layers, the default value is applied)
    nB: number of total paging occasions in T
    N: min(T,nB)
    PF_offset: offset used for PF determination
    UE_ID: IMSI mod 1024
    First-PDCCH-monitoring-occasion-of-PO: First PDCCH monitoring occasion of a paging occasion
  Parameters nB, PF_offset, firstPDCCH-MonitoringOccasionOfPO and the length of default DRX Cycle are signaled in SystemInformationBlock1.
  If the UE has no IMSI, for instance when making an emergency call without USIM, the UE shall use as default identity UE_ID=0 in the PF and i_s formulas above.
  IMSI is given as sequence of digits of type Integer (0 . . . 9). IMSI shall in the formulae above be interpreted as a decimal integer number, where the first digit given in the sequence represents the highest order digit.
  For example:

IMSI=12(digit1=1,digit2=2)

In the calculations, this shall be interpreted as the decimal integer "12", not "1×16+2=18".
  Related text changes in TS 38.331 could for instance be provided as discussed below.

The Information Element IE DownlinConfigCommon provides common downlink parameters of a cell, and the DownlinkConfigCommonSIB information element may be provided as illustrated in FIG. 9 according to some embodiments of inventive concepts.

RRC multiplicity and type constraint values/definitions may be provided as illustrated in FIG. 10 and FIG. 11 according to some embodiments of inventive concepts.

Second embodiments of inventive concepts are discussed below.

In second embodiments of inventive concepts, the First-PDCCH-monitoring-occasion-of-PO parameter is not introduced. Instead, the paging-SearchSpace parameters (i.e. the Monitoring-periodicity-PDCCH-slot, Monitoring-offset-PDCCH-slot and Monitoring-symbols-PDCCH-within-slot parameters with TS 38.213 terminology or the monitoring-SlotPeriodicityAndOffset and monitoringSymbolsWithin-Slot parameters with TS 38.331 terminology) are interpreted such that they configure only the number of PDCCH monitoring occasions that match the number of beams used for paging (i.e. the number of beams used for SSB transmissions in a SS Burst Set), i.e. the PDCCH beam transmissions constituting a beam sweep that forms a PO. To configure multiple POs in a PF the network instead provides/configures multiple instances of the Monitoring-offset-PDCCH-slot parameter (one for each time-multiplexed PO in the PF). Each of the Monitoring-offset-PDCCH-slot parameters would then mark the beginning of a new PO and the other two parameters in the paging-SearchSpace, i.e. the Monitoring-periodicity-PDCCH-slot and Monitoring-symbols-PDCCH-within-slot parameters, would then be used to configure another set of PDCCH monitoring occasions, matching the number of beams used for paging, starting at each of these Monitoring-offset-PDCCH-slot parameters.

For instance, the Monitoring-offset-PDCCH-slot parameter may be changed to a multi-value parameter, e.g. consisting of a sequence of integer values, each representing an offset from the start of the paging frame and thus representing the start of a set of PDCCH monitoring occasions forming a PO.

In a variant of this embodiment, the multiplicity of the Monitoring-offset-PDCCH-slot parameter—i.e. the multiplicity of the PO configurations—is realized as a set of monitoringSlotPeriodicityAndOffset parameters in the system information, or by making the monitoringSlotPeriodicityAndOffset parameter a multi-value parameter, e.g. containing a sequence of values. This means that the correspondence to the Monitoring-periodicity-PDCCH-slot parameter also will be provided in multiple instances or with multiple values.

Third embodiments of inventive concepts are discussed below.

In a third embodiment—also this one without the First-PDCCH-monitoring-occasion-of-PO parameter—the paging-SearchSpace parameters are interpreted as in embodiment 2, i.e. such that they configure only the number of PDCCH monitoring occasions that match the number of beams used for paging (i.e. the number of beams used for SSB transmissions in a SS Burst Set), i.e. the PDCCH beam transmissions constituting a beam sweep that forms a PO. To configure multiple POs in a PF the network configures multiple sets of the paging-SearchSpace parameters (one for each PO in the PF). In the system information (and with TS 38.331 terminology), this can be realized as multiple instances of the monitoringSlotPeriodicityAndOffset parameter and the monitoringSymbolsWithinSlot parameter (which also may be achieved by making these parameters multi-value parameters, e.g. in the form of sequences of values).

Fourth embodiments of inventive concepts are discussed below.

In yet another embodiment (which would be combined with any of the other embodiments above or which would complement any of the other embodiments above), the number of PDCCH monitoring occasions in a "burst" of PDCCH monitoring occasions (in embodiment 1) or the number of PDCCH monitoring occasions considered to be configured by a single set of paging-SearchSpace parameters (or a single set of paging-SearchSpace parameter values) (in embodiments 2 and 3) is not implicitly specified by the number of SSB beams in a SS Burst Set, but is instead explicitly configured. This explicit configuration may come in the form of a new parameter, e.g. denoted Number-of-paging-beams-in-PO or Number-of-PDCCH-monitoring-occasions-in-PO. This new parameter could be seen as part of the paging-SearchSpace parameters or may be provided as a separate parameter, e.g. included in the PCCH-Config parameter in the system information (and in TS 38.331).

According to some embodiments, the paging-SearchSpace parameters and/or interpretations thereof may be complemented, modified, and/or to changed, in order to make the configured PDCCH monitoring occasions matching the beam transmissions used for paging form groups, or "bursts", of PDCCH monitoring occasions (with preferably relatively densely packed PDCCH monitoring occasions) with gaps between the groups/"bursts" and wherein each such group/"burst" constitutes a paging occasions.

Each of the first, second, and third embodiments discussed above may achieve this goal in a slightly different way. According to some embodiments, one or more parameter(s) may be used to point out the start (e.g. in the form of a first PDCCH monitoring occasion) of each group/"burst" of PDCCH monitoring occasions constituting a PO.

Operations of a wireless device UE will now be discussed with reference to the flow chart of FIG. 4 according to some embodiments of inventive concepts. For example, modules may be stored in wireless terminal memory 4005 of FIG. 1, and these modules may provide instructions so that when the instructions of a module are executed by wireless device processor 4003, processor 4003 performs respective operations of the flow chart of FIG. 4.

At block 401, processor 4003 may receive (through transceiver 4001) parameters that define a plurality of potential PDCCH monitoring occasions distributed over a paging frame and that define at least one paging occasion (that may be associated with the paging frame). For example, the parameters may define a plurality of paging occasions wherein each one of the plurality of paging occasions includes a respective subset of the plurality of potential PDCCH monitoring occasions, wherein consecutive paging occasions are spaced apart in time with at least one of the plurality of potential PDCCH monitoring occasions therebetween not being included in any of the plurality of paging occasions (and thus unused for paging). In addition or in an alternative, at least one of the plurality of potential PDCCH monitoring occasions may be between a beginning of the paging frame and the at least one paging occasion, wherein the at least one of the plurality of potential PDCCH monitoring occasions is not included in any paging occasion of the paging frame (and thus unused for paging).

For example, one of the plurality of potential PDCCH monitoring occasions between two consecutive paging occasions may not be included in any paging occasions of the paging frame, and another of the plurality of potential PDCCH monitoring occasions between a beginning of the paging frame and a first one of the paging occasions of the frame may not be included in any paging occasions of the paging frame.

The parameters may include a length parameter that defines a length of each of the plurality of paging occasions as a number of potential PDCCH monitoring occasions that is included in a paging occasion and/or as a number of beams used to transmit a page during a paging occasion. The parameters may include offset parameters (e.g., firstPDCCH-MonitoringOccasionOfPO information elements) defining respective offsets for each of the respective paging occasions with respect to a beginning of the paging frame, and the offset parameters may be defined based on a number of potential PDCCH monitoring occasions.

At block 403, processor 4003 may monitor for paging messages based on the parameters that define the plurality of potential PDCCH monitoring occasions and the plurality of paging occasions. For example, monitoring may include monitoring for paging messages using potential PDCCH monitoring occasions included in the paging occasions without monitoring the at least one of the plurality of potential PDCCH monitoring occasions that is not included in any of the plurality of paging occasions.

At block 405, processor 4003 may receive (through transceiver 4001) a paging message for the wireless device using at least one of the plurality of potential PDCCH monitoring occasions included in at least one of the paging occasions as defined by the parameters.

At block 407, processor 4003 may transmit (through transceiver 4001) an uplink communication responsive to receiving the paging message.

Figure 4:
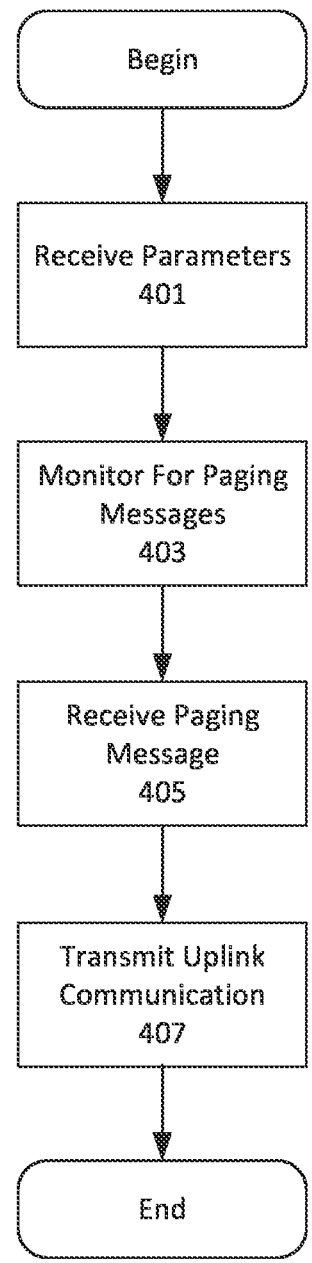
FIG. 4 is a flow chart illustrating operations of a wireless device according to some embodiments of inventive concepts.

Various operations from the flow chart of FIG. 4 may be optional with respect to some embodiments of wireless devices and related methods. Regarding methods of example embodiment 16 (set forth below), for example, operations of blocks 405 and 407 of FIG. 4 may be optional.

Operations of a base station gNB will now be discussed with reference to the flow chart of FIG. 3. For example, modules may be stored in base station memory 5005 of FIG. 2, and these modules may provide instructions so that when the instructions of a module are executed by processor 5003, processor 5003 performs respective operations of the flow chart of FIG. 3.

At block 301, processor 5003 may generate parameters that define a plurality of potential PDCCH monitoring occasions distributed over a paging frame and that define at least one paging occasion (that may be associated with the paging frame). For example, the parameters may define a plurality of paging occasions wherein each one of the plurality of paging occasions includes a respective subset of the plurality of potential PDCCH monitoring occasions, wherein consecutive paging occasions are spaced apart in time with at least one of the plurality of potential PDCCH monitoring occasions therebetween not being included in any of the plurality of paging occasions (and thus unused for paging). In addition or in an alternative, at least one of the plurality of potential PDCCH monitoring occasions may be between a beginning of the paging frame and the at least one paging occasion, and the at least one of the plurality of potential PDCCH monitoring occasions is not included in any paging occasion of the paging frame (and thus unused for paging).

For example, one of the plurality of potential PDCCH monitoring occasions between two consecutive paging occasions may not be included in any paging occasions of the paging frame, and another of the plurality of potential PDCCH monitoring occasions between a beginning of the paging frame and a first one of the paging occasions of the frame may not be included in any paging occasions of the paging frame.

The parameters may include a length parameter that defines a length of each of the plurality of paging occasions as a number of potential PDCCH monitoring occasions that is included in a paging occasion and/or as a number of beams used to transmit a page during a paging occasion. The parameters may include offset parameters (e.g., firstPDCCH-MonitoringOccasionOfPO information elements) defining respective offsets for each of the respective paging occasions with respect to a beginning of the paging frame, and the offset parameters may be defined based on a number of potential PDCCH monitoring occasions.

At block 303, processor 5003 may transmit (through transceiver 5001) the parameters over a radio interface to a wireless device.

At block 305, processor 5003 may transmit (through transceiver 5001) a paging message for the wireless device using at least one of the plurality of potential PDCCH monitoring occasions included in at least one of the paging occasions as defined by the parameters. For example, the plurality of potential PDCCH monitoring occasions of a subset for a paging occasion may be associated with different beams, and the paging message for the wireless terminal may be transmitted using one of the plurality of paging occasions so that the paging message is transmitted using at least two of the plurality of potential PDCCH monitoring occasions of the subset for the paging occasion using the different beams.

At block 307, processor 5003 may schedule a transmission for a second wireless device using a resource including the at least one of the plurality of potential PDCCH monitoring occasions that is not included in any of the plurality of paging occasions.

At block 309, processor 5003 may communicate the transmission between the second wireless device and the base station using the resource including the at least one of the plurality of potential PDCCH monitoring occasions that is not included in any of the plurality of paging occasions. For example, the transmission may be an uplink transmission, wherein scheduling the uplink transmission includes scheduling a TDD uplink transmission for the second wireless device.

Figure 3:
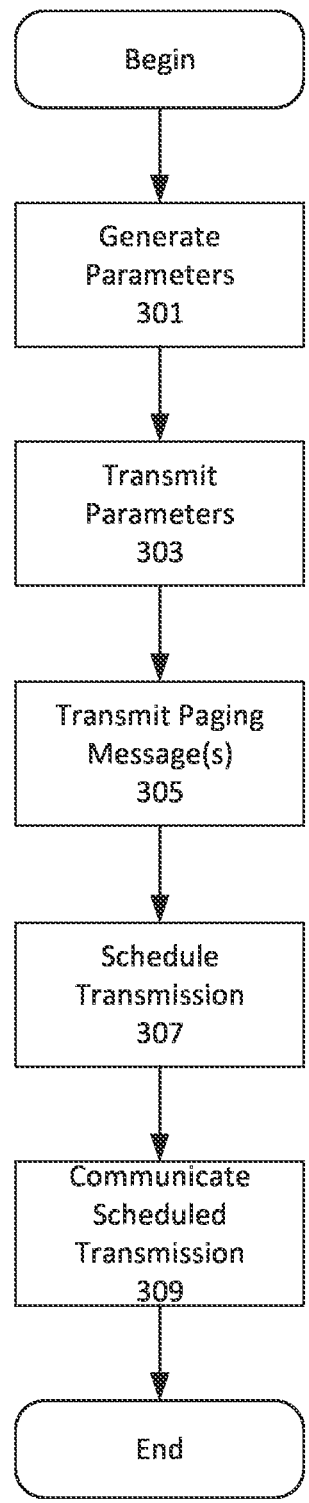
FIG. 3 is a flow chart illustrating operations of a RAN node according to some embodiments of inventive concepts.

Various operations from the flow chart of FIG. 3 may be optional with respect to some embodiments of base stations and related methods. Regarding methods of example embodiment 1 (set forth below), for example, operations of blocks 305, 307, and 309 of FIG. 3 may be optional.

Example Embodiments of inventive concepts are discussed below.

1. A method of operating a base station of a wireless communication network, the method comprising: generating (301) parameters that define a plurality of potential monitoring occasions distributed over a paging frame and that define a plurality of paging occasions distributed over the paging frame, wherein each one of the plurality of paging occasions includes a respective subset of the plurality of potential monitoring occasions, wherein consecutive paging occasions of the paging frame are spaced apart in time with at least one of the potential monitoring occasions therebetween not being included in any of the plurality of paging occasions distributed over the paging frame; and transmitting (303) the parameters over a radio interface to a wireless device.

2. The method of any of Embodiments 1-2 further comprising: transmitting (305) a paging message for the wireless device using at least one of the potential monitoring occasions included in at least one of the paging occasions of the paging frame as defined by the parameters.

3. The method of any of Embodiments 1-2, wherein each one of the plurality of paging occasions includes the respective subset with a plurality of the potential monitoring occasions each associated with a respective different beam.

4. The method of Embodiment 3 further comprising: transmitting (305) a paging message for the wireless terminal using one of the plurality of paging occasions so that the paging message is transmitted using each of the potential monitoring occasions of the paging occasion using the respective different beam.

5. The method of any of Embodiments 1-4, further comprising: scheduling (307) an uplink transmission for a second wireless device using a resource including the at least one of the potential monitoring occasions that is not included in any of the plurality of paging occasions.

6. The method of Embodiment 5, wherein scheduling the uplink transmission comprises scheduling a TDD uplink transmission for the second wireless device.

7. The method of any of Embodiments 1-6, wherein the paging frame is divided into 20 slots, and wherein each of the plurality of paging occasions has a duration that is greater than a duration of a slot.

8. The method of Embodiment 7, wherein each slot includes 14 symbols, and wherein each of the potential monitoring occasions has a duration of at least one symbol and no more than 4 symbols.

9. The method of any of Embodiments 1-8, wherein the parameters include a length parameter that defines a length of each of the plurality of paging occasions as a number of potential monitoring occasions that is included in a paging occasion.

10. The method of any of Embodiments 1-8, wherein the parameters include a length parameter that defines a length of each of the plurality of paging occasions as a number of beams used to transmit a page during a paging occasion.

11. The method of any of Embodiments 1-10, wherein the parameters include offset parameters defining respective offsets for each of the respective paging occasions with respect to a beginning of the frame.

12. The method of Embodiment 11, wherein the offset parameters are defined based on a number of potential monitoring occasions.

13. The method of any of Embodiments 1-10, wherein the parameters include an initial offset parameter defining an offset of an initial one of the paging occasions of the frame with respect to a beginning of the frame, and a subsequent offset parameter defining an offset between consecutive paging occasions of the frame.

14. The method of Embodiment 13, wherein the initial offset parameter is defined based on a number of unused potential monitoring occasions of the frame before the initial paging occasion, and wherein the subsequent offset parameter is defined based on a number of unused potential monitoring occasions between consecutive paging occasions of the frame.

15. The method of any of Embodiments 1-14, wherein the at least one of the plurality of potential monitoring occasions between consecutive paging occasions is unused for paging.

16. A method of operating a wireless device in wireless communication network, the method comprising: receiving (401) parameters that define a plurality of potential monitoring occasions distributed over a paging frame and that define a plurality of paging occasions distributed over the paging frame, wherein each one of the plurality of paging occasions includes a respective subset of the plurality of potential monitoring occasions, wherein consecutive paging occasions of the paging frame are spaced apart in time with at least one of the potential monitoring occasions therebetween not being included in any of the plurality of paging occasions distributed over the paging frame; and monitoring (403) for paging messages based on the parameters that define the plurality of potential monitoring occasions and the plurality of paging occasions.

17. The method of Embodiment 16 further comprising: receiving (405) a paging message for the wireless device using at least one of the potential monitoring occasions included in at least one of the paging occasions of the paging frame as defined by the parameters.

18. The method of Embodiment 17 further comprising: transmitting (407) an uplink communication responsive to receiving the paging message.

19. The method of any of Embodiments 16-18, wherein monitoring comprises monitoring for paging messages using potential monitoring occasions included with the paging occasions of the frame without monitoring the at least one of the potential monitoring occasions that is not included in any of the plurality of paging occasions.

20. The method of any of Embodiments 16-19, wherein the paging frame is divided into 20 slots, and wherein each of the plurality of paging occasions has a duration that is greater than a duration of a slot.

21. The method of Embodiment 20, wherein each slot includes 14 symbols, and wherein each of the potential monitoring occasions has a duration of at least one symbol and no more than 4 symbols.

22. The method of any of Embodiments 16-21, wherein the parameters include a length parameter that defines a length of each of the plurality of paging occasions as a number of potential monitoring occasions that is included in a paging occasion.

23. The method of any of Embodiments 16-21, wherein the parameters include a length parameter that defines a length of each of the plurality of paging occasions as a number of beams used to transmit a page during a paging occasion.

24. The method of any of Embodiments 16-23, wherein the parameters include offset parameters defining respective offsets for each of the respective paging occasions with respect to a beginning of the frame.

25. The method of Embodiment 24, wherein the offset parameters are defined based on a number of potential monitoring occasions.

26. The method of any of Embodiments 16-23, wherein the parameters include an initial offset parameter defining an offset of an initial one of the paging occasions of the frame with respect to a beginning of the frame, and a subsequent offset parameter defining an offset between consecutive paging occasions of the frame.

27. The method of Embodiment 26, wherein the initial offset parameter is defined based on a number of unused potential monitoring occasions of the frame before the initial paging occasion, and wherein the subsequent offset parameter is defined based on a number of unused potential monitoring occasions between consecutive paging occasions of the frame.

28. The method of any of Embodiments 16-27, wherein the at least one of the plurality of potential monitoring occasions between consecutive paging occasions is unused for paging.

29. The method of Embodiment 5 further comprising: receiving (309) the uplink transmission from the second wireless device scheduled using the resource including the at least one of the potential monitoring occasions that is not included in any of the plurality of paging occasions.

30. A wireless device (4000) that is adapted to perform according to any of Embodiments 16-28.

31. A network node (5000) that is adapted to perform according to any of Embodiments 1-15 and 29.

32. A wireless device (4000) comprising: a processor (4003); and memory (4005) coupled with the processor, wherein the memory comprises instructions that when executed by the processor cause the processor to perform operations according to any of Embodiments 16-28.

33. A network node (5000) comprising: a processor (5003); and memory (5005) coupled with the processor, wherein the memory comprises instructions that when executed by the processor cause the processor to perform operations according to any of Embodiments 1-15 and 29.

Abbreviations/Acronyms from the present disclosure are explained below.

| Abbreviation | Explanation |
| --- | --- |
| 3GPP | 3rd Generation Partnership Project |
| 5G | 5th Generation |
| 5G-S-TMSI | The temporary identifier used in NR as a replacement of the S-TMSI in LTE. |
| ASN.1 | Abstract Syntax Notation One |
| CMAS | Commercial Mobile Alert System |
| CN | Core Network |
| CORESET | Control Resource Set |
| CRC | Cyclic Redundancy Check |
| DCI | Downlink Control Information |
| div | Notation indicating integer division. |
| DL | Downlink |
| DRX | Discontinuous Reception |
| eDRX | Extended DRX |
| eNB | Evolved NodeB |
| ETWS | Earthquake and Tsunami Warning System |
| GHz | gigaherz |
| gNB | The term for a radio base station in NR (corresponding to eNB in LTE). |
| ID | Identity/Identifier |
| IMSI | International Mobile Subscriber Identity |
| IvD | Invention disclosure |
| LTE | Long Term Evolution |
| MIB | Master Information Block |
| mod | modulo |
| ms | millisecond |
| MSI | Minimum System Information |
| NAS | Non-Access Stratum |
| NR | New Radio (The term used for the 5G radio interface and radio access network in the technical reports and standard specifications 3GPP are working on.) |
| OFDM | Orthogonal Frequency Division Multiplex |
| OSI | Other System Information |
| PBCH | Physical Broadcast Channel |
| PCI | Physical Cell Identity |
| PDCCH | Physical Downlink Control Channel |
| PDSCH | Physical Downlink Shared Channel |
| PF | Paging Frame |
| PO | Paging Occasion |
| P-RNTI | Paging RNTI |
| PSS | Primary Synchronization Signal |
| QCL | Quasi Co-Located |
| RAN | Random Access Network |
| RMSI | Remaining Minimum System Information |
| RNA | RAN Notification Area |
| RNTI | Radio Network Temporary Identifier |
| RRC | Radio Resource Control |
| SCS | Subcarrier Spacing |
| SFN | System Frame Number |
| SI | System Information |
| SIB | System Information Block |

-continued

| Abbreviation | Explanation |
| --- | --- |
| SS | Synchronization Signal |
| SSB | SS Block |
| SSS | Secondary Synchronization Signal |
| S-TMSI | S-Temporary Mobile Subscriber Identity |
| TDD | Time Division Duplex |
| TRP | Transmission/Reception Point |
| TS | Technical Specification |
| TSG | Technical Specification Group |
| UE | User Equipment |
| WG | Working Group |

Citations for references from the present disclosure are provide below.

[1] R2-1807689 "Reference Frame & PO Determination: Non Default Association", contribution by Samsung to 3GPP TSG-RAN WG2 meeting #102 in Busan, South Korea, May 21-May 25, 2018

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

In the following additional embodiments will be described with reference to FIG. 12 and following Figures. For simplicity, the wireless network of FIG. 12 only depicts network QQ106, network nodes QQ160 and QQ160*b*, and WDs QQ110, QQ110*b*, and QQ110*c* (also referred to as mobile terminals). In practice, a wireless network may further include any additional elements suitable to support communication between wireless devices or between a wireless device and another communication device, such as a landline telephone, a service provider, or any other network node or end device. Of the illustrated components, network node QQ160 and wireless device (WD) QQ110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network QQ106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node QQ160 and WD QQ110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multi-cast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

Figure 12:
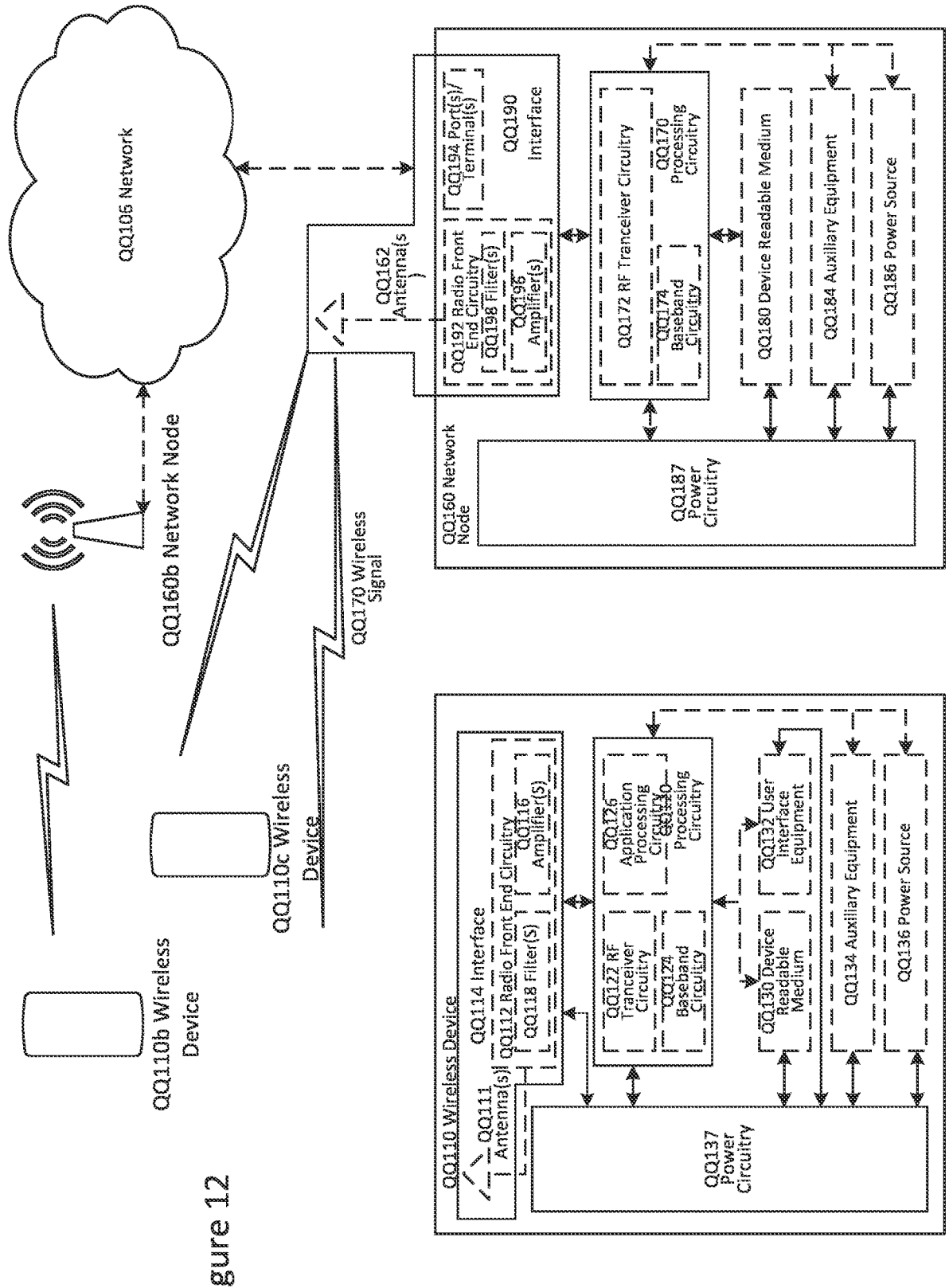
FIG. 12 is a block diagram of a wireless network in accordance with some embodiments.

In FIG. 12, network node QQ160 includes processing circuitry QQ170, device readable medium QQ180, interface QQ190, auxiliary equipment QQ184, power source QQ186, power circuitry QQ187, and antenna QQ162. Although network node QQ160 illustrated in the example wireless network of FIG. 12 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node QQ160 are depicted as single boxes located within a larger box, or nested within multiple boxes, in practice, a network node may comprise multiple different physical components that make up a single illustrated component (e.g., device readable medium QQ180 may comprise multiple separate hard drives as well as multiple RAM modules).

Similarly, network node QQ160 may be composed of multiple physically separate components (e.g., a NodeB component and a RNC component, or a BTS component and a BSC component, etc.), which may each have their own respective components. In certain scenarios in which network node QQ160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node QQ160 may be configured to support multiple radio access technologies (RATs). In such embodiments, some components may be duplicated (e.g., separate device readable medium QQ180 for the different RATs) and some components may be reused (e.g., the same antenna QQ162 may be shared by the RATs). Network node QQ160 may also include multiple sets of the various illustrated components for different wireless technologies integrated into network node QQ160, such as, for example, GSM, WCDMA, LTE, NR, WiFi, or Bluetooth wireless technologies. These wireless technologies may be integrated into the same or different chip or set of chips and other components within network node QQ160.

Processing circuitry QQ170 is configured to perform any determining, calculating, or similar operations (e.g., certain obtaining operations) described herein as being provided by a network node. These operations performed by processing circuitry QQ170 may include processing information obtained by processing circuitry QQ170 by, for example, converting the obtained information into other information, comparing the obtained information or converted information to information stored in the network node, and/or performing one or more operations based on the obtained information or converted information, and as a result of said processing making a determination.

Processing circuitry QQ170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node QQ160 components, such as device readable medium QQ180, network node QQ160 functionality. For example, processing circuitry QQ170 may execute instructions stored in device readable medium QQ180 or in memory within processing circuitry QQ170. Such functionality may include providing any of the various wireless features, functions, or benefits discussed herein. In some embodiments, processing circuitry QQ170 may include a system on a chip (SOC).

In some embodiments, processing circuitry QQ170 may include one or more of radio frequency (RF) transceiver circuitry QQ172 and baseband processing circuitry QQ174. In some embodiments, radio frequency (RF) transceiver circuitry QQ172 and baseband processing circuitry QQ174 may be on separate chips (or sets of chips), boards, or units, such as radio units and digital units. In alternative embodiments, part or all of RF transceiver circuitry QQ172 and baseband processing circuitry QQ174 may be on the same chip or set of chips, boards, or units.

In certain embodiments, some or all of the functionality described herein as being provided by a network node, base station, gNB or other such network device may be performed by processing circuitry QQ170 executing instructions stored on device readable medium QQ180 or memory within processing circuitry QQ170. In alternative embodiments, some or all of the functionality may be provided by processing circuitry QQ170 without executing instructions stored on a separate or discrete device readable medium, such as in a hard-wired manner. In any of those embodiments, whether executing instructions stored on a device readable storage medium or not, processing circuitry QQ170 can be configured to perform the described functionality. The benefits provided by such functionality are not limited to processing circuitry QQ170 alone or to other components of network node QQ160, but are enjoyed by network node QQ160 as a whole, and/or by end users and the wireless network generally.

Device readable medium QQ180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry QQ170. Device readable medium QQ180 may store any suitable instructions, data or information, including a computer program, software, an application including one or more of logic, rules, code, tables, etc. and/or other instructions capable of being executed by processing circuitry QQ170 and, utilized by network node QQ160. Device readable medium QQ180 may be used to store any calculations made by processing circuitry QQ170 and/or any data received via interface QQ190. In some embodiments, processing circuitry QQ170 and device readable medium QQ180 may be considered to be integrated.

Interface QQ190 is used in the wired or wireless communication of signalling and/or data between network node QQ160, network QQ106, and/or WDs QQ110. As illustrated, interface QQ190 comprises port(s)/terminal(s) QQ194 to send and receive data, for example to and from network QQ106 over a wired connection. Interface QQ190 also includes radio front end circuitry QQ192 that may be coupled to, or in certain embodiments a part of, antenna QQ162. Radio front end circuitry QQ192 comprises filters QQ198 and amplifiers QQ196. Radio front end circuitry QQ192 may be connected to antenna QQ162 and processing circuitry QQ170. Radio front end circuitry may be configured to condition signals communicated between antenna QQ162 and processing circuitry QQ170. Radio front end circuitry QQ192 may receive digital data that is to be sent out to other network nodes or WDs via a wireless connection. Radio front end circuitry QQ192 may convert the digital data into a radio signal having the appropriate channel and bandwidth parameters using a combination of filters QQ198 and/or amplifiers QQ196. The radio signal may then be transmitted via antenna QQ162. Similarly, when receiving data, antenna QQ162 may collect radio signals which are then converted into digital data by radio front end circuitry QQ192. The digital data may be passed to processing circuitry QQ170. In other embodiments, the interface may comprise different components and/or different combinations of components.

In certain alternative embodiments, network node QQ160 may not include separate radio front end circuitry QQ192, instead, processing circuitry QQ170 may comprise radio front end circuitry and may be connected to antenna QQ162 without separate radio front end circuitry QQ192. Similarly, in some embodiments, all or some of RF transceiver circuitry QQ172 may be considered a part of interface QQ190. In still other embodiments, interface QQ190 may include one or more ports or terminals QQ194, radio front end circuitry QQ192, and RF transceiver circuitry QQ172, as part of a radio unit (not shown), and interface QQ190 may communicate with baseband processing circuitry QQ174, which is part of a digital unit (not shown).

Antenna QQ162 may include one or more antennas, or antenna arrays, configured to send and/or receive wireless signals. Antenna QQ162 may be coupled to radio front end circuitry QQ190 and may be any type of antenna capable of transmitting and receiving data and/or signals wirelessly. In some embodiments, antenna QQ162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna QQ162 may be separate from network node QQ160 and may be connectable to network node QQ160 through an interface or port.

Antenna QQ162, interface QQ190, and/or processing circuitry QQ170 may be configured to perform any receiving operations and/or certain obtaining operations described herein as being performed by a network node. Any information, data and/or signals may be received from a wireless device, another network node and/or any other network equipment. Similarly, antenna QQ162, interface QQ190, and/or processing circuitry QQ170 may be configured to perform any transmitting operations described herein as being performed by a network node. Any information, data and/or signals may be transmitted to a wireless device, another network node and/or any other network equipment.

Power circuitry QQ187 may comprise, or be coupled to, power management circuitry and is configured to supply the components of network node QQ160 with power for performing the functionality described herein. Power circuitry QQ187 may receive power from power source QQ186. Power source QQ186 and/or power circuitry QQ187 may be configured to provide power to the various components of network node QQ160 in a form suitable for the respective components (e.g., at a voltage and current level needed for each respective component). Power source QQ186 may either be included in, or external to, power circuitry QQ187 and/or network node QQ160. For example, network node QQ160 may be connectable to an external power source (e.g., an electricity outlet) via an input circuitry or interface such as an electrical cable, whereby the external power source supplies power to power circuitry QQ187. As a further example, power source QQ186 may comprise a source of power in the form of a battery or battery pack which is connected to, or integrated in, power circuitry QQ187. The battery may provide backup power should the external power source fail. Other types of power sources, such as photovoltaic devices, may also be used.

Alternative embodiments of network node QQ160 may include additional components beyond those shown in FIG. 12 that may be responsible for providing certain aspects of the network node's functionality, including any of the functionality described herein and/or any functionality necessary to support the subject matter described herein. For example, network node QQ160 may include user interface equipment to allow input of information into network node QQ160 and to allow output of information from network node QQ160. This may allow a user to perform diagnostic, maintenance, repair, and other administrative functions for network node QQ160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device QQ110 includes antenna QQ111, interface QQ114, processing circuitry QQ120, device readable medium QQ130, user interface equipment QQ132, auxiliary equipment QQ134, power source QQ136 and power circuitry QQ137. WD QQ110 may include multiple sets of one or more of the illustrated components for different wireless technologies supported by WD QQ110, such as, for example, GSM, WCDMA, LTE, NR, WiFi, WiMAX, or Bluetooth wireless technologies, just to mention a few. These wireless technologies may be integrated into the same or different chips or set of chips as other components within WD QQ110.

Antenna QQ111 may include one or more antennas or antenna arrays, configured to send and/or receive wireless signals, and is connected to interface QQ114. In certain alternative embodiments, antenna QQ111 may be separate from WD QQ110 and be connectable to WD QQ110 through an interface or port. Antenna QQ111, interface QQ114, and/or processing circuitry QQ120 may be configured to perform any receiving or transmitting operations described herein as being performed by a WD. Any information, data and/or signals may be received from a network node and/or another WD. In some embodiments, radio front end circuitry and/or antenna QQ111 may be considered an interface.

As illustrated, interface QQ114 comprises radio front end circuitry QQ112 and antenna QQ111. Radio front end circuitry QQ112 comprise one or more filters QQ118 and amplifiers QQ116. Radio front end circuitry QQ114 is connected to antenna QQ111 and processing circuitry QQ120, and is configured to condition signals communicated between antenna QQ111 and processing circuitry QQ120. Radio front end circuitry QQ112 may be coupled to or a part of antenna QQ111. In some embodiments, WD QQ110 may not include separate radio front end circuitry QQ112; rather, processing circuitry QQ120 may comprise radio front end circuitry and may be connected to antenna QQ111. Similarly, in some embodiments, some or all of RF transceiver circuitry QQ122 may be considered a part of interface QQ114. Radio front end circuitry QQ112 may receive digital data that is to be sent out to other network nodes or WDs via a wireless connection. Radio front end circuitry QQ112 may convert the digital data into a radio signal having the appropriate channel and bandwidth parameters using a combination of filters QQ118 and/or amplifiers QQ116. The radio signal may then be transmitted via antenna QQ111. Similarly, when receiving data, antenna QQ111 may collect radio signals which are then converted into digital data by radio front end circuitry QQ112. The digital data may be passed to processing circuitry QQ120. In other embodiments, the interface may comprise different components and/or different combinations of components.

Processing circuitry QQ120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD QQ110 components, such as device readable medium QQ130, WD QQ110 functionality. Such functionality may include providing any of the various wireless features or benefits discussed herein. For example, processing circuitry QQ120 may execute instructions stored in device readable medium QQ130 or in memory within processing circuitry QQ120 to provide the functionality disclosed herein.

As illustrated, processing circuitry QQ120 includes one or more of RF transceiver circuitry QQ122, baseband processing circuitry QQ124, and application processing circuitry QQ126. In other embodiments, the processing circuitry may comprise different components and/or different combinations of components. In certain embodiments processing circuitry QQ120 of WD QQ110 may comprise a SOC. In some embodiments, RF transceiver circuitry QQ122, baseband processing circuitry QQ124, and application processing circuitry QQ126 may be on separate chips or sets of chips. In alternative embodiments, part or all of baseband processing circuitry QQ124 and application processing circuitry QQ126 may be combined into one chip or set of chips, and RF transceiver circuitry QQ122 may be on a separate chip or set of chips. In still alternative embodiments, part or all of RF transceiver circuitry QQ122 and baseband processing circuitry QQ124 may be on the same chip or set of chips, and application processing circuitry QQ126 may be on a separate chip or set of chips. In yet other alternative embodiments, part or all of RF transceiver circuitry QQ122, baseband processing circuitry QQ124, and application processing circuitry QQ126 may be combined in the same chip or set of chips. In some embodiments, RF transceiver circuitry QQ122 may be a part of interface QQ114. RF transceiver circuitry QQ122 may condition RF signals for processing circuitry QQ120.

In certain embodiments, some or all of the functionality described herein as being performed by a WD may be provided by processing circuitry QQ120 executing instructions stored on device readable medium QQ130, which in certain embodiments may be a computer-readable storage medium. In alternative embodiments, some or all of the functionality may be provided by processing circuitry QQ120 without executing instructions stored on a separate or discrete device readable storage medium, such as in a hard-wired manner. In any of those particular embodiments, whether executing instructions stored on a device readable storage medium or not, processing circuitry QQ120 can be configured to perform the described functionality. The benefits provided by such functionality are not limited to processing circuitry QQ120 alone or to other components of WD QQ110, but are enjoyed by WD QQ110 as a whole, and/or by end users and the wireless network generally.

Processing circuitry QQ120 may be configured to perform any determining, calculating, or similar operations (e.g., certain obtaining operations) described herein as being performed by a WD. These operations, as performed by processing circuitry QQ120, may include processing information obtained by processing circuitry QQ120 by, for example, converting the obtained information into other information, comparing the obtained information or converted information to information stored by WD QQ110, and/or performing one or more operations based on the obtained information or converted information, and as a result of said processing making a determination.

Device readable medium QQ130 may be operable to store a computer program, software, an application including one or more of logic, rules, code, tables, etc. and/or other instructions capable of being executed by processing circuitry QQ120. Device readable medium QQ130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry QQ120. In some embodiments, processing circuitry QQ120 and device readable medium QQ130 may be considered to be integrated.

User interface equipment QQ132 may provide components that allow for a human user to interact with WD QQ110. Such interaction may be of many forms, such as visual, audial, tactile, etc. User interface equipment QQ132 may be operable to produce output to the user and to allow the user to provide input to WD QQ110. The type of interaction may vary depending on the type of user interface equipment QQ132 installed in WD QQ110. For example, if WD QQ110 is a smart phone, the interaction may be via a touch screen; if WD QQ110 is a smart meter, the interaction may be through a screen that provides usage (e.g., the number of gallons used) or a speaker that provides an audible alert (e.g., if smoke is detected). User interface equipment QQ132 may include input interfaces, devices and circuits, and output interfaces, devices and circuits. User interface equipment QQ132 is configured to allow input of information into WD QQ110, and is connected to processing circuitry QQ120 to allow processing circuitry QQ120 to process the input information. User interface equipment QQ132 may include, for example, a microphone, a proximity or other sensor, keys/buttons, a touch display, one or more cameras, a USB port, or other input circuitry. User interface equipment QQ132 is also configured to allow output of information from WD QQ110, and to allow processing circuitry QQ120 to output information from WD QQ110. User interface equipment QQ132 may include, for example, a speaker, a display, vibrating circuitry, a USB port, a headphone interface, or other output circuitry. Using one or more input and output interfaces, devices, and circuits, of user interface equipment QQ132, WD QQ110 may communicate with end users and/or the wireless network, and allow them to benefit from the functionality described herein.

Auxiliary equipment QQ134 is operable to provide more specific functionality which may not be generally performed by WDs. This may comprise specialized sensors for doing measurements for various purposes, interfaces for additional types of communication such as wired communications etc. The inclusion and type of components of auxiliary equipment QQ134 may vary depending on the embodiment and/or scenario.

Power source QQ136 may, in some embodiments, be in the form of a battery or battery pack. Other types of power sources, such as an external power source (e.g., an electricity outlet), photovoltaic devices or power cells, may also be used. WD QQ110 may further comprise power circuitry QQ137 for delivering power from power source QQ136 to the various parts of WD QQ110 which need power from power source QQ136 to carry out any functionality described or indicated herein. Power circuitry QQ137 may in certain embodiments comprise power management circuitry. Power circuitry QQ137 may additionally or alternatively be operable to receive power from an external power source; in which case WD QQ110 may be connectable to the external power source (such as an electricity outlet) via input circuitry or an interface such as an electrical power cable. Power circuitry QQ137 may also in certain embodiments be operable to deliver power from an external power source to power source QQ136. This may be, for example, for the charging of power source QQ136. Power circuitry QQ137 may perform any formatting, converting, or other modification to the power from power source QQ136 to make the power suitable for the respective components of WD QQ110 to which power is supplied.

Figure 13:
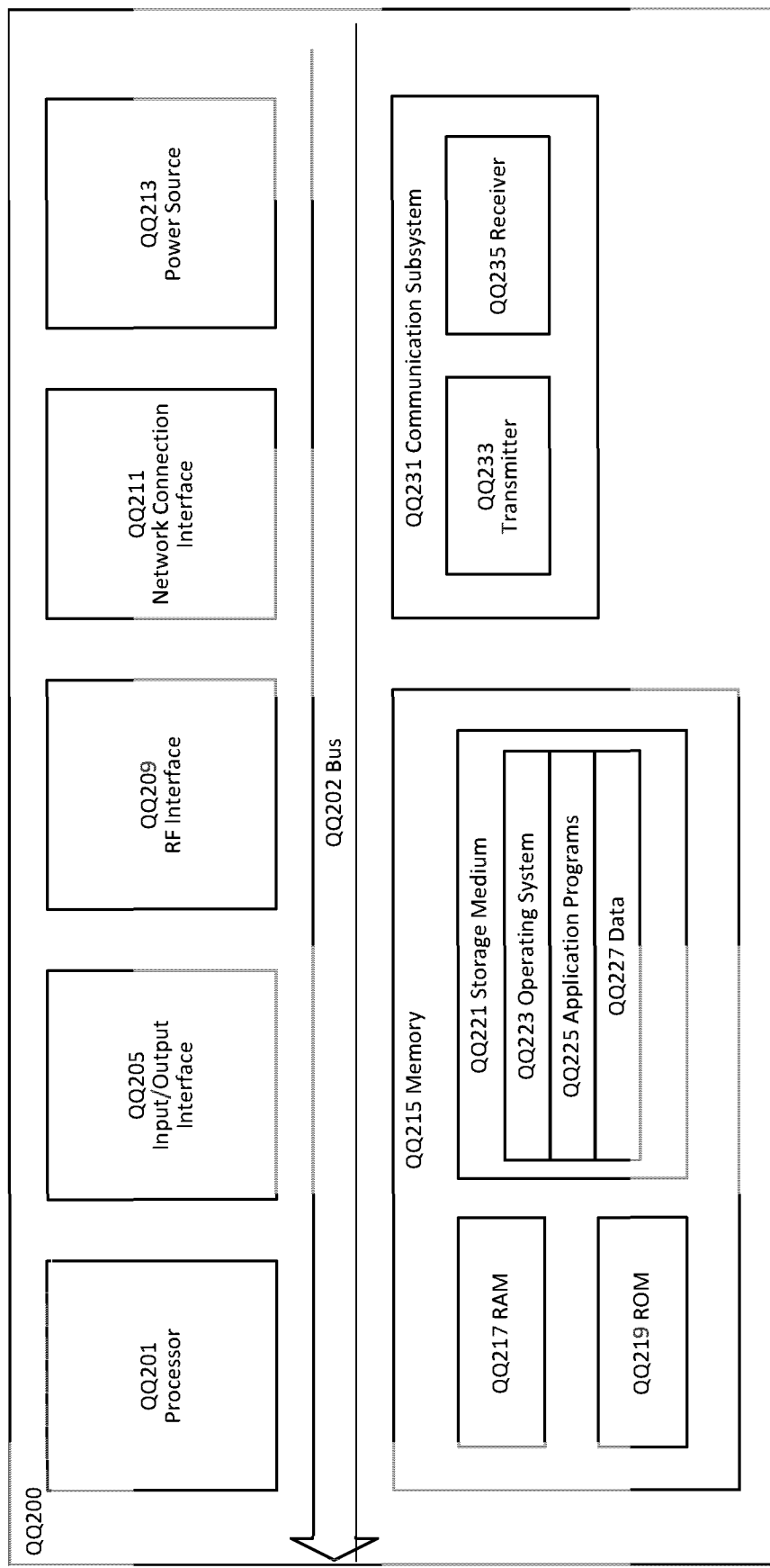
FIG. 13 is a block diagram of a user equipment in accordance with some embodiments

FIG. 13 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE QQ2200 may be any UE identified by the 3rd Generation Partnership Project (3GPP), including a NB-IoT UE, a machine type communication (MTC) UE, and/or an enhanced MTC (eMTC) UE. UE QQ200, as illustrated in FIG. 13, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 13 is a UE, the components discussed herein are equally applicable to a WD, and vice-versa.

In FIG. 13, UE QQ200 includes processing circuitry QQ201 that is operatively coupled to input/output interface QQ205, radio frequency (RF) interface QQ209, network connection interface QQ211, memory QQ215 including random access memory (RAM) QQ217, read-only memory (ROM) QQ219, and storage medium QQ221 or the like, communication subsystem QQ231, power source QQ233, and/or any other component, or any combination thereof. Storage medium QQ221 includes operating system QQ223, application program QQ225, and data QQ227. In other embodiments, storage medium QQ221 may include other similar types of information. Certain UEs may utilize all of the components shown in FIG. 13, or only a subset of the components. The level of integration between the components may vary from one UE to another UE. Further, certain UEs may contain multiple instances of a component, such as multiple processors, memories, transceivers, transmitters, receivers, etc.

In FIG. 13, processing circuitry QQ201 may be configured to process computer instructions and data. Processing circuitry QQ201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry QQ201 may include two central processing units (CPUs). Data may be information in a form suitable for use by a computer.

In the depicted embodiment, input/output interface QQ205 may be configured to provide a communication interface to an input device, output device, or input and output device. UE QQ200 may be configured to use an output device via input/output interface QQ205. An output device may use the same type of interface port as an input device. For example, a USB port may be used to provide input to and output from UE QQ200. The output device may be a speaker, a sound card, a video card, a display, a monitor, a printer, an actuator, an emitter, a smartcard, another output device, or any combination thereof. UE QQ200 may be configured to use an input device via input/output interface QQ205 to allow a user to capture information into UE QQ200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 13, RF interface QQ209 may be configured to provide a communication interface to RF components such as a transmitter, a receiver, and an antenna. Network connection interface QQ211 may be configured to provide a communication interface to network QQ243a. Network QQ243a may encompass wired and/or wireless networks such as a local-area network (LAN), a wide-area network (WAN), a computer network, a wireless network, a telecommunications network, another like network or any combination thereof. For example, network QQ243a may comprise a Wi-Fi network. Network connection interface QQ211 may be configured to include a receiver and a transmitter interface used to communicate with one or more other devices over a communication network according to one or more communication protocols, such as Ethernet, TCP/IP, SONET, ATM, or the like. Network connection interface QQ211 may implement receiver and transmitter functionality appropriate to the communication network links (e.g., optical, electrical, and the like). The transmitter and receiver functions may share circuit components, software or firmware, or alternatively may be implemented separately.

RAM QQ217 may be configured to interface via bus QQ202 to processing circuitry QQ201 to provide storage or caching of data or computer instructions during the execution of software programs such as the operating system, application programs, and device drivers. ROM QQ219 may be configured to provide computer instructions or data to processing circuitry QQ201. For example, ROM QQ219 may be configured to store invariant low-level system code or data for basic system functions such as basic input and output (I/O), startup, or reception of keystrokes from a keyboard that are stored in a non-volatile memory. Storage medium QQ221 may be configured to include memory such as RAM, ROM, programmable read-only memory (PROM), erasable programmable read-only memory (EPROM), electrically erasable programmable read-only memory (EE-PROM), magnetic disks, optical disks, floppy disks, hard disks, removable cartridges, or flash drives. In one example, storage medium QQ221 may be configured to include operating system QQ223, application program QQ225 such as a web browser application, a widget or gadget engine or another application, and data file QQ227. Storage medium QQ221 may store, for use by UE QQ200, any of a variety of various operating systems or combinations of operating systems.

Storage medium QQ221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium QQ221 may allow UE QQ200 to access computer-executable instructions, application programs or the like, stored on transitory or non-transitory memory media, to off-load data, or to upload data. An article of manufacture, such as one utilizing a communication system may be tangibly embodied in storage medium QQ221, which may comprise a device readable medium.

In FIG. 13, processing circuitry QQ201 may be configured to communicate with network QQ243*b* using communication subsystem QQ231. Network QQ243*a* and network QQ243*b* may be the same network or networks or different network or networks. Communication subsystem QQ231 may be configured to include one or more transceivers used to communicate with network QQ243*b*. For example, communication subsystem QQ231 may be configured to include one or more transceivers used to communicate with one or more remote transceivers of another device capable of wireless communication such as another WD, UE, or base station of a radio access network (RAN) according to one or more communication protocols, such as IEEE 802.QQ2, CDMA, WCDMA, GSM, LTE, UTRAN, WiMax, or the like. Each transceiver may include transmitter QQ233 and/or receiver QQ235 to implement transmitter or receiver functionality, respectively, appropriate to the RAN links (e.g., frequency allocations and the like). Further, transmitter QQ233 and receiver QQ235 of each transceiver may share circuit components, software or firmware, or alternatively may be implemented separately.

In the illustrated embodiment, the communication functions of communication subsystem QQ231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem QQ231 may include cellular communication, Wi-Fi communication, Bluetooth communication, and GPS communication. Network QQ243*b* may encompass wired and/or wireless networks such as a local-area network (LAN), a wide-area network (WAN), a computer network, a wireless network, a telecommunications network, another like network or any combination thereof. For example, network QQ243*b* may be a cellular network, a Wi-Fi network, and/or a near-field network. Power source QQ213 may be configured to provide alternating current (AC) or direct current (DC) power to components of UE QQ200.

The features, benefits and/or functions described herein may be implemented in one of the components of UE QQ200 or partitioned across multiple components of UE QQ200. Further, the features, benefits, and/or functions described herein may be implemented in any combination of hardware, software or firmware. In one example, communication subsystem QQ231 may be configured to include any of the components described herein. Further, processing circuitry QQ201 may be configured to communicate with any of such components over bus QQ202. In another example, any of such components may be represented by program instructions stored in memory that when executed by processing circuitry QQ201 perform the corresponding functions described herein. In another example, the functionality of any of such components may be partitioned between processing circuitry QQ201 and communication subsystem QQ231. In another example, the non-computationally intensive functions of any of such components may be implemented in software or firmware and the computationally intensive functions may be implemented in hardware.

Figure 14:
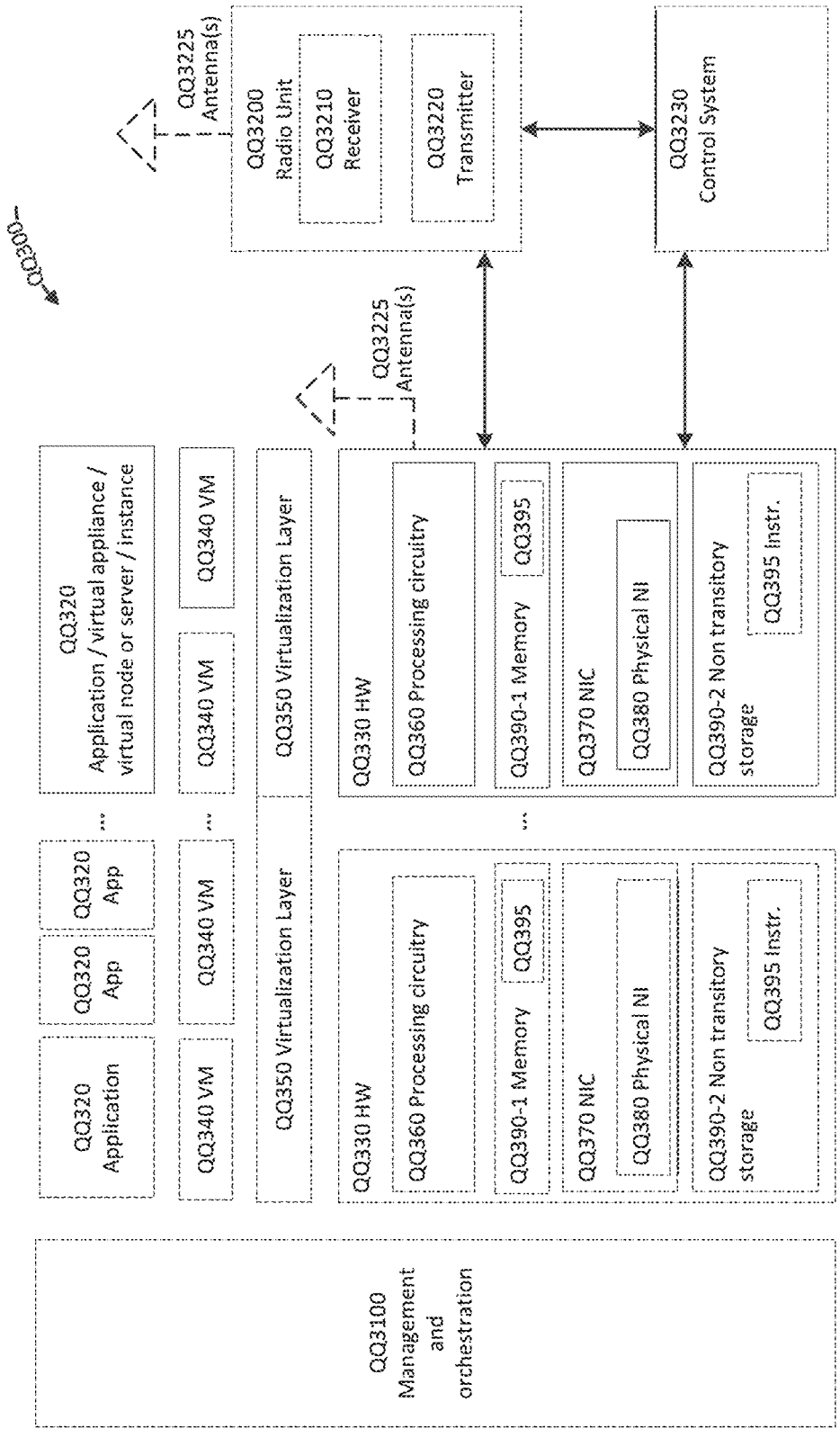
FIG. 14 is a block diagram of a virtualization environment in accordance with some embodiments.

FIG. 14 is a schematic block diagram illustrating a virtualization environment QQ300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments QQ300 hosted by one or more of hardware nodes QQ330. Further, in embodiments in which the virtual node is not a radio access node or does not require radio connectivity (e.g., a core network node), then the network node may be entirely virtualized.

The functions may be implemented by one or more applications QQ320 (which may alternatively be called software instances, virtual appliances, network functions, virtual nodes, virtual network functions, etc.) operative to implement some of the features, functions, and/or benefits of some of the embodiments disclosed herein. Applications QQ320 are run in virtualization environment QQ300 which provides hardware QQ330 comprising processing circuitry QQ360 and memory QQ390. Memory QQ390 contains instructions QQ395 executable by processing circuitry QQ360 whereby application QQ320 is operative to provide one or more of the features, benefits, and/or functions disclosed herein.

Virtualization environment QQ300, comprises general-purpose or special-purpose network hardware devices QQ330 comprising a set of one or more processors or processing circuitry QQ360, which may be commercial off-the-shelf (COTS) processors, dedicated Application Specific Integrated Circuits (ASICs), or any other type of processing circuitry including digital or analog hardware components or special purpose processors. Each hardware device may comprise memory QQ390-1 which may be non-persistent memory for temporarily storing instructions QQ395 or software executed by processing circuitry QQ360. Each hardware device may comprise one or more network interface controllers (NICs) QQ370, also known as network interface cards, which include physical network interface QQ380. Each hardware device may also include non-transitory, persistent, machine-readable storage media QQ390-2 having stored therein software QQ395 and/or instructions executable by processing circuitry QQ360. Software QQ395 may include any type of software including software for instantiating one or more virtualization layers QQ350 (also referred to as hypervisors), software to execute virtual machines QQ340 as well as software allowing it to execute functions, features and/or benefits described in relation with some embodiments described herein.

Virtual machines QQ340, comprise virtual processing, virtual memory, virtual networking or interface and virtual storage, and may be run by a corresponding virtualization layer QQ350 or hypervisor. Different embodiments of the instance of virtual appliance QQ320 may be implemented on one or more of virtual machines QQ340, and the implementations may be made in different ways.

During operation, processing circuitry QQ360 executes software QQ395 to instantiate the hypervisor or virtualization layer QQ350, which may sometimes be referred to as a virtual machine monitor (VMM). Virtualization layer QQ350 may present a virtual operating platform that appears like networking hardware to virtual machine QQ340.

As shown in FIG. 14, hardware QQ330 may be a standalone network node with generic or specific components. Hardware QQ330 may comprise antenna QQ3225 and may implement some functions via virtualization. Alternatively, hardware QQ330 may be part of a larger cluster of hardware (e.g. such as in a data center or customer premise equipment (CPE)) where many hardware nodes work together and are managed via management and orchestration (MANO) QQ3100, which, among others, oversees lifecycle management of applications QQ320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine QQ340 may be a software implementation of a physical machine that runs programs as if they were executing on a physical, non-virtualized machine. Each of virtual machines QQ340, and that part of hardware QQ330 that executes that virtual machine, be it hardware dedicated to that virtual machine and/or hardware shared by that virtual machine with others of the virtual machines QQ340, forms a separate virtual network elements (VNE).

Still in the context of NFV, Virtual Network Function (VNF) is responsible for handling specific network functions that run in one or more virtual machines QQ340 on top of hardware networking infrastructure QQ330 and corresponds to application QQ320 in FIG. 14.

In some embodiments, one or more radio units QQ3200 that each include one or more transmitters QQ3220 and one or more receivers QQ3210 may be coupled to one or more antennas QQ3225. Radio units QQ3200 may communicate directly with hardware nodes QQ330 via one or more appropriate network interfaces and may be used in combination with the virtual components to provide a virtual node with radio capabilities, such as a radio access node or a base station.

In some embodiments, some signalling can be effected with the use of control system QQ3230 which may alternatively be used for communication between the hardware nodes QQ330 and radio units QQ3200.

Figure 15:
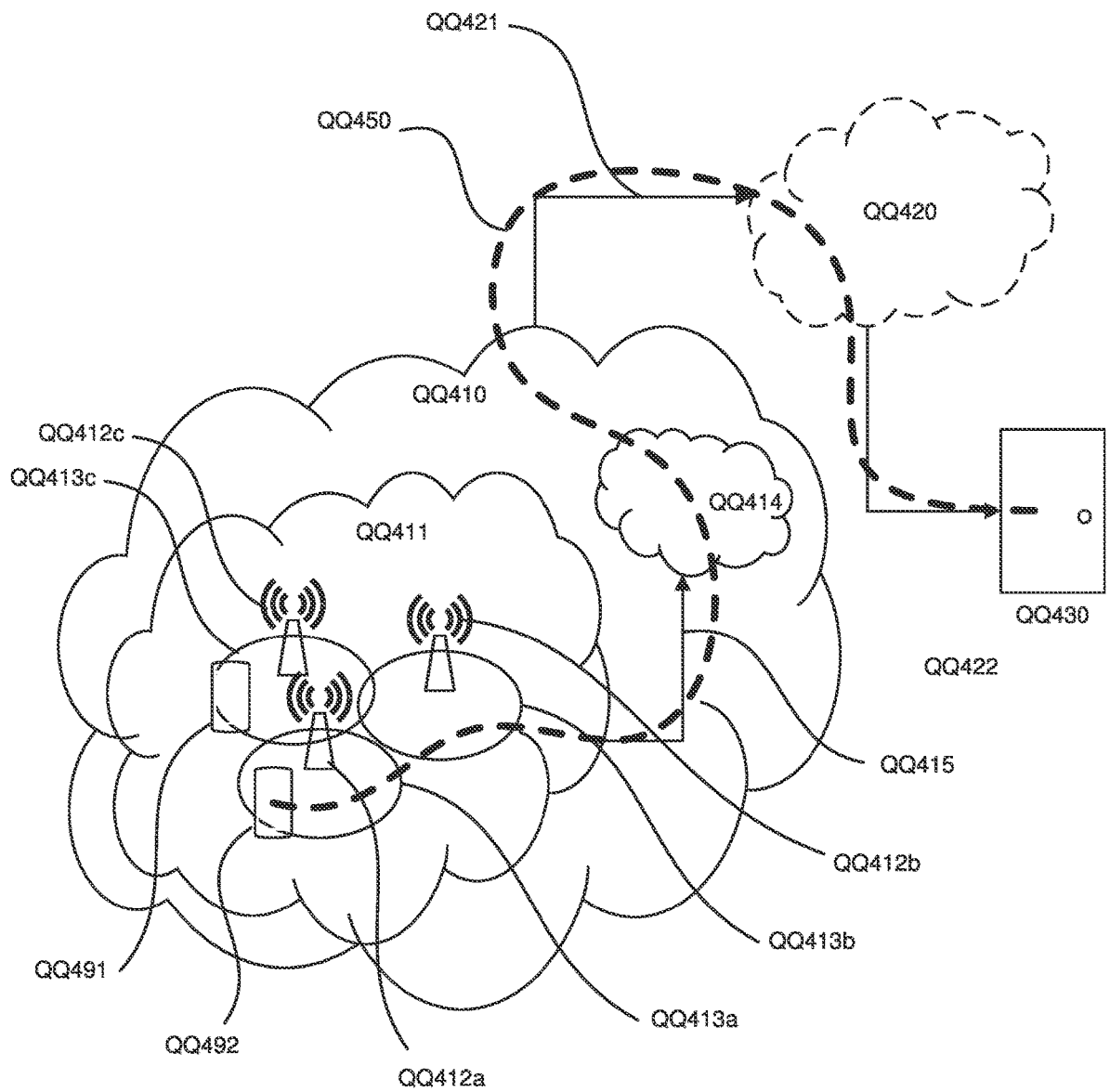
FIG. 15 is a block diagram of a telecommunication network connected via an intermediate network to a host computer in accordance with some embodiments.

With reference to FIG. 15, in accordance with an embodiment, a communication system includes telecommunication network QQ410, such as a 3GPP-type cellular network, which comprises access network QQ411, such as a radio access network, and core network QQ414. Access network QQ411 comprises a plurality of base stations QQ412a, QQ412b, QQ412c, such as NBs, eNBs, gNBs or other types of wireless access points, each defining a corresponding coverage area QQ413a, QQ413b, QQ413c. Each base station QQ412a, QQ412b, QQ412c is connectable to core network QQ414 over a wired or wireless connection QQ415. A first UE QQ491 located in coverage area QQ413c is configured to wirelessly connect to, or be paged by, the corresponding base station QQ412c. A second UE QQ492 in coverage area QQ413a is wirelessly connectable to the corresponding base station QQ412a. While a plurality of UEs QQ491, QQ492 are illustrated in this example, the disclosed embodiments are equally applicable to a situation where a sole UE is in the coverage area or where a sole UE is connecting to the corresponding base station QQ412.

Telecommunication network QQ410 is itself connected to host computer QQ430, which may be embodied in the hardware and/or software of a standalone server, a cloud-implemented server, a distributed server or as processing resources in a server farm. Host computer QQ430 may be under the ownership or control of a service provider, or may be operated by the service provider or on behalf of the service provider. Connections QQ421 and QQ422 between telecommunication network QQ410 and host computer QQ430 may extend directly from core network QQ414 to host computer QQ430 or may go via an optional intermediate network QQ420. Intermediate network QQ420 may be one of, or a combination of more than one of, a public, private or hosted network; intermediate network QQ420, if any, may be a backbone network or the Internet; in particular, intermediate network QQ420 may comprise two or more sub-networks (not shown).

The communication system of FIG. 15 as a whole enables connectivity between the connected UEs QQ491, QQ492 and host computer QQ430. The connectivity may be described as an over-the-top (OTT) connection QQ450. Host computer QQ430 and the connected UEs QQ491, QQ492 are configured to communicate data and/or signaling via OTT connection QQ450, using access network QQ411, core network QQ414, any intermediate network QQ420 and possible further infrastructure (not shown) as intermediaries. OTT connection QQ450 may be transparent in the sense that the participating communication devices through which OTT connection QQ450 passes are unaware of routing of uplink and downlink communications. For example, base station QQ412 may not or need not be informed about the past routing of an incoming downlink communication with data originating from host computer QQ430 to be forwarded (e.g., handed over) to a connected UE QQ491. Similarly, base station QQ412 need not be aware of the future routing of an outgoing uplink communication originating from the UE QQ491 towards the host computer QQ430.

Example implementations, in accordance with an embodiment, of the UE, base station and host computer discussed in the preceding paragraphs will now be described with reference to FIG. 16. In communication system QQ500, host computer QQ510 comprises hardware QQ515 including communication interface QQ516 configured to set up and maintain a wired or wireless connection with an interface of a different communication device of communication system QQ500. Host computer QQ510 further comprises processing circuitry QQ518, which may have storage and/or processing capabilities. In particular, processing circuitry QQ518 may comprise one or more programmable processors, application-specific integrated circuits, field programmable gate arrays or combinations of these (not shown) adapted to execute instructions. Host computer QQ510 further comprises software QQ511, which is stored in or accessible by host computer QQ510 and executable by processing circuitry QQ518. Software QQ511 includes host application QQ512. Host application QQ512 may be operable to provide a service to a remote user, such as UE QQ530 connecting via OTT connection QQ550 terminating at UE QQ530 and host computer QQ510. In providing the service to the remote user, host application QQ512 may provide user data which is transmitted using OTT connection QQ550.

Communication system QQ500 further includes base station QQ520 provided in a telecommunication system and comprising hardware QQ525 enabling it to communicate with host computer QQ510 and with UE QQ530. Hardware QQ525 may include communication interface QQ526 for setting up and maintaining a wired or wireless connection with an interface of a different communication device of communication system QQ500, as well as radio interface QQ527 for setting up and maintaining at least wireless connection QQ570 with UE QQ530 located in a coverage area (not shown in FIG. 16) served by base station QQ520. Communication interface QQ526 may be configured to facilitate connection QQ560 to host computer QQ510. Connection QQ560 may be direct or it may pass through a core network (not shown in FIG. 16) of the telecommunication system and/or through one or more intermediate networks outside the telecommunication system. In the embodiment shown, hardware QQ525 of base station QQ520 further includes processing circuitry QQ528, which may comprise one or more programmable processors, application-specific integrated circuits, field programmable gate arrays or combinations of these (not shown) adapted to execute instructions. Base station QQ520 further has software QQ521 stored internally or accessible via an external connection.

Communication system QQ500 further includes UE QQ530 already referred to. Its hardware QQ535 may include radio interface QQ537 configured to set up and maintain wireless connection QQ570 with a base station serving a coverage area in which UE QQ530 is currently located. Hardware QQ535 of UE QQ530 further includes processing circuitry QQ538, which may comprise one or more programmable processors, application-specific integrated circuits, field programmable gate arrays or combinations of these (not shown) adapted to execute instructions. UE QQ530 further comprises software QQ531, which is stored in or accessible by UE QQ530 and executable by processing circuitry QQ538. Software QQ531 includes client application QQ532. Client application QQ532 may be operable to provide a service to a human or non-human user via UE QQ530, with the support of host computer QQ510. In host computer QQ510, an executing host application QQ512 may communicate with the executing client application QQ532 via OTT connection QQ550 terminating at UE QQ530 and host computer QQ510. In providing the service to the user, client application QQ532 may receive request data from host application QQ512 and provide user data in response to the request data. OTT connection QQ550 may transfer both the request data and the user data. Client application QQ532 may interact with the user to generate the user data that it provides.

Figure 16:
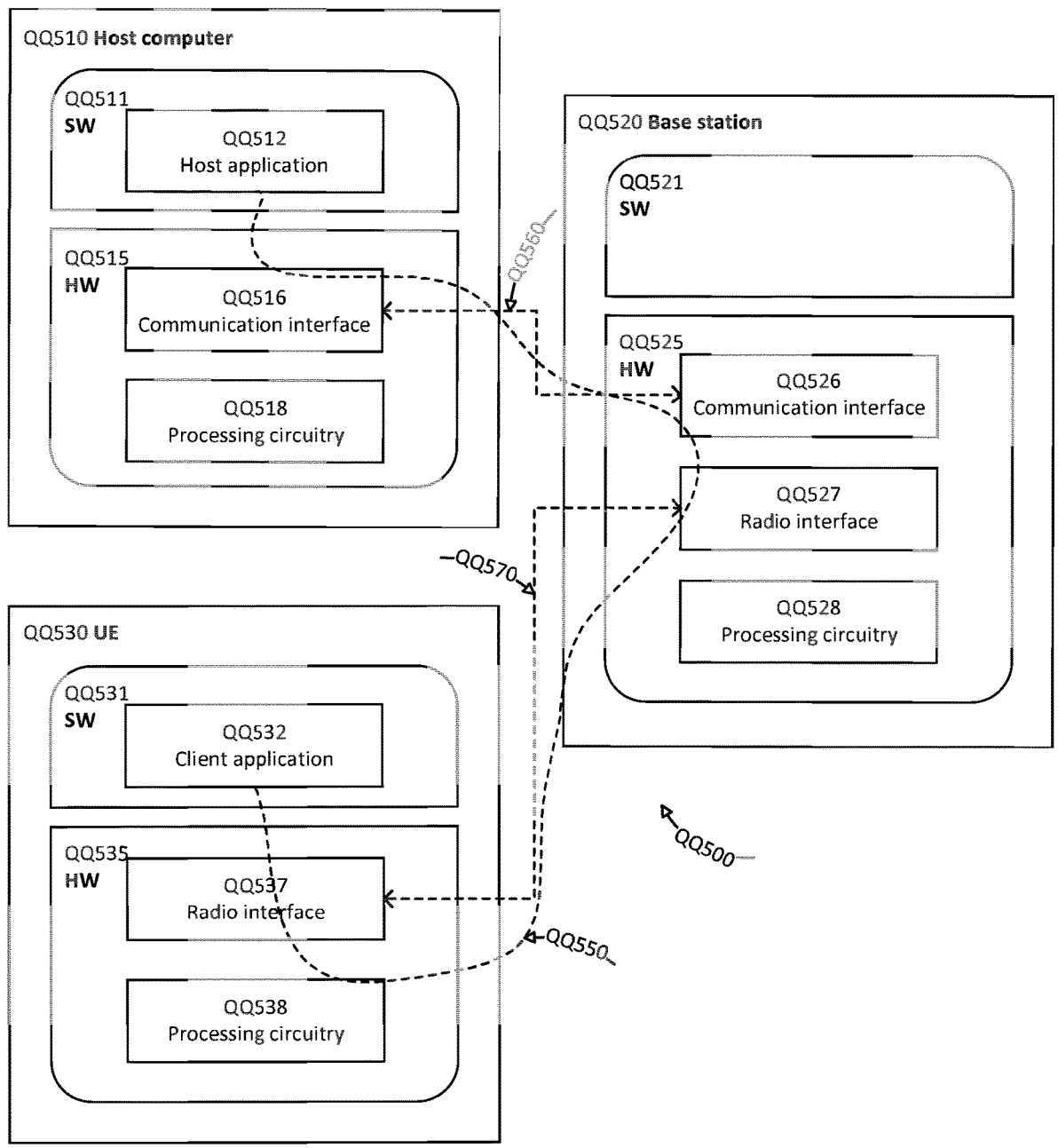
FIG. 16 is a block diagram of a host computer communicating via a base station with a user equipment over a partially wireless connection in accordance with some embodiments.

It is noted that host computer QQ510, base station QQ520 and UE QQ530 illustrated in FIG. 16 may be similar or identical to host computer QQ430, one of base stations QQ412a, QQ412b, QQ412c and one of UEs QQ491, QQ492 of FIG. 15, respectively. This is to say, the inner workings of these entities may be as shown in FIG. 16 and independently, the surrounding network topology may be that of FIG. 15.

In FIG. 16, OTT connection QQ550 has been drawn abstractly to illustrate the communication between host computer QQ510 and UE QQ530 via base station QQ520, without explicit reference to any intermediary devices and the precise routing of messages via these devices. Network infrastructure may determine the routing, which it may be configured to hide from UE QQ530 or from the service provider operating host computer QQ510, or both. While OTT connection QQ550 is active, the network infrastructure may further take decisions by which it dynamically changes the routing (e.g., on the basis of load balancing consideration or reconfiguration of the network).

Wireless connection QQ570 between UE QQ530 and base station QQ520 is in accordance with the teachings of the embodiments described throughout this disclosure. One or more of the various embodiments may improve the performance of OTT services provided to UE QQ530 using OTT connection QQ550, in which wireless connection QQ570 forms the last segment. More precisely, the teachings of these embodiments may improve the deblock filtering for video processing and thereby provide benefits such as improved video encoding and/or decoding.

A measurement procedure may be provided for the purpose of monitoring data rate, latency and other factors on which the one or more embodiments improve. There may further be an optional network functionality for reconfiguring OTT connection QQ550 between host computer QQ510 and UE QQ530, in response to variations in the measurement results. The measurement procedure and/or the network functionality for reconfiguring OTT connection QQ550 may be implemented in software QQ511 and hardware QQ515 of host computer QQ510 or in software QQ531 and hardware QQ535 of UE QQ530, or both. In embodiments, sensors (not shown) may be deployed in or in association with communication devices through which OTT connection QQ550 passes; the sensors may participate in the measurement procedure by supplying values of the monitored quantities exemplified above, or supplying values of other physical quantities from which software QQ511, QQ531 may compute or estimate the monitored quantities. The reconfiguring of OTT connection QQ550 may include message format, retransmission settings, preferred routing etc.; the reconfiguring need not affect base station QQ520, and it may be unknown or imperceptible to base station QQ520. Such procedures and functionalities may be known and practiced in the art. In certain embodiments, measurements may involve proprietary UE signaling facilitating host computer QQ510's measurements of throughput, propagation times, latency and the like. The measurements may be implemented in that software QQ511 and QQ531 causes messages to be transmitted, in particular empty or 'dummy' messages, using OTT connection QQ550 while it monitors propagation times, errors etc.

Figure 17:
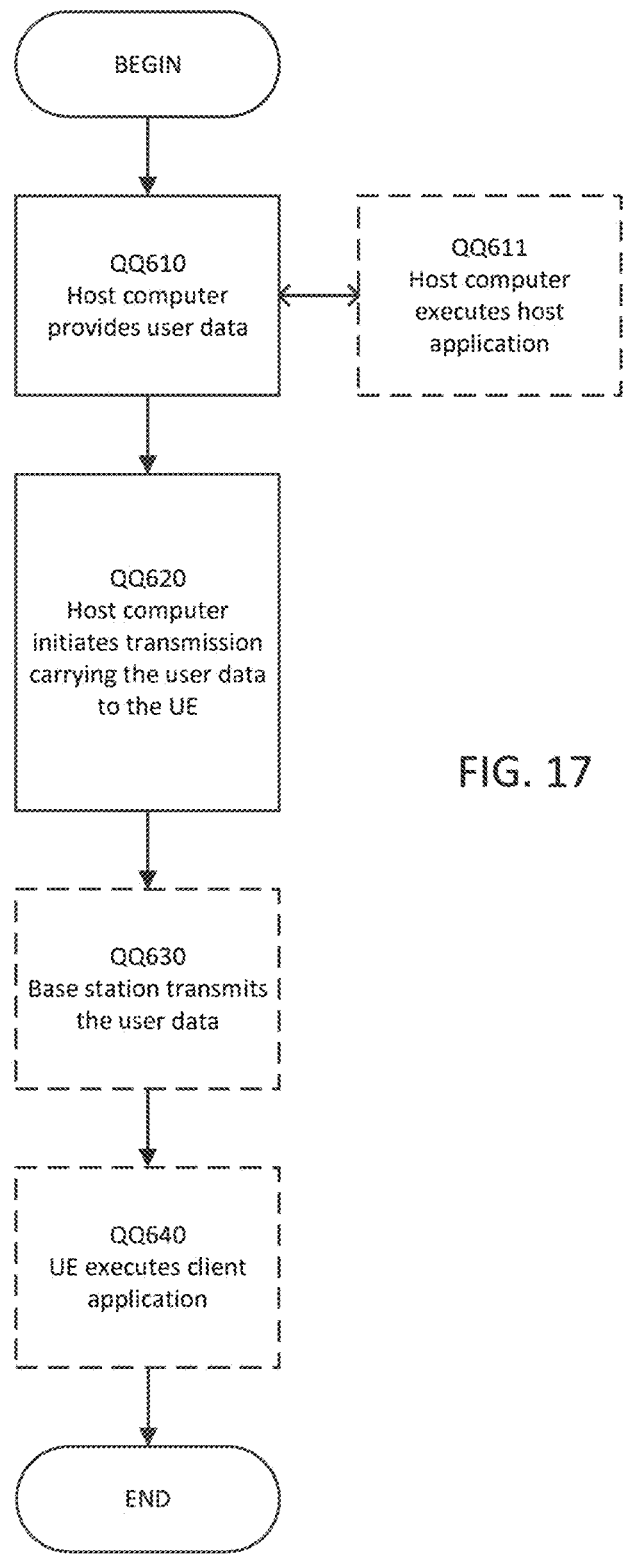
FIG. 17 is a block diagram of methods implemented in a communication system including a host computer, a base station and a user equipment in accordance with some embodiments.

FIG. 17 is a flowchart illustrating a method implemented in a communication system, in accordance with one embodiment. The communication system includes a host computer, a base station and a UE which may be those described with reference to FIGS. 15 and 16. For simplicity of the present disclosure, only drawing references to FIG. 17 will be included in this section. In step QQ610, the host computer provides user data. In substep QQ611 (which may be optional) of step QQ610, the host computer provides the user data by executing a host application. In step QQ620, the host computer initiates a transmission carrying the user data to the UE. In step QQ630 (which may be optional), the base station transmits to the UE the user data which was carried in the transmission that the host computer initiated, in accordance with the teachings of the embodiments described throughout this disclosure. In step QQ640 (which may also be optional), the UE executes a client application associated with the host application executed by the host computer.

Figure 18:
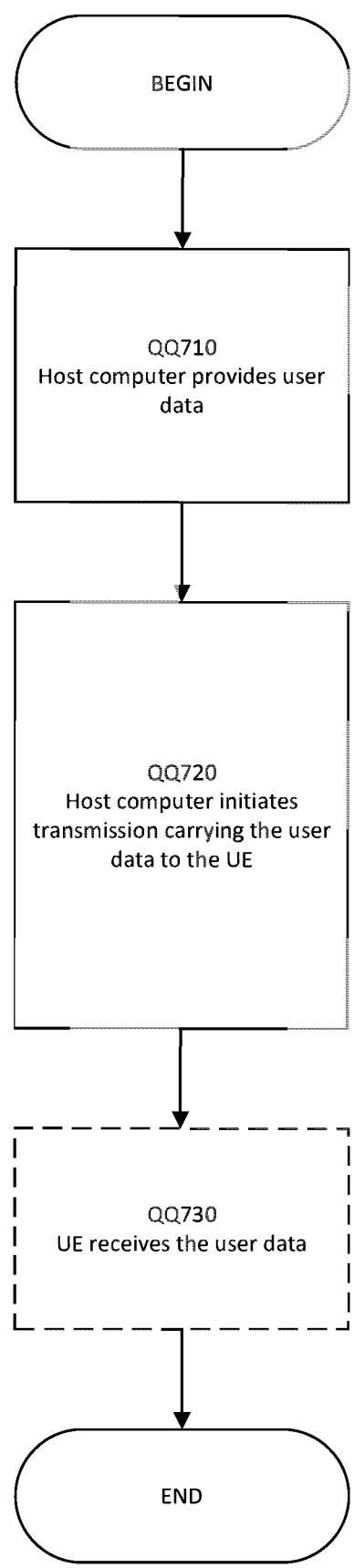
FIG. 18 is a block diagram of methods implemented in a communication system including a host computer, a base station and a user equipment in accordance with some embodiments.

FIG. 18 is a flowchart illustrating a method implemented in a communication system, in accordance with one embodiment. The communication system includes a host computer, a base station and a UE which may be those described with reference to FIGS. 15 and 16. For simplicity of the present disclosure, only drawing references to FIG. 18 will be included in this section. In step QQ710 of the method, the host computer provides user data. In an optional substep (not shown) the host computer provides the user data by executing a host application. In step QQ720, the host computer initiates a transmission carrying the user data to the UE. The transmission may pass via the base station, in accordance with the teachings of the embodiments described throughout this disclosure. In step QQ730 (which may be optional), the UE receives the user data carried in the transmission.

Figure 19:
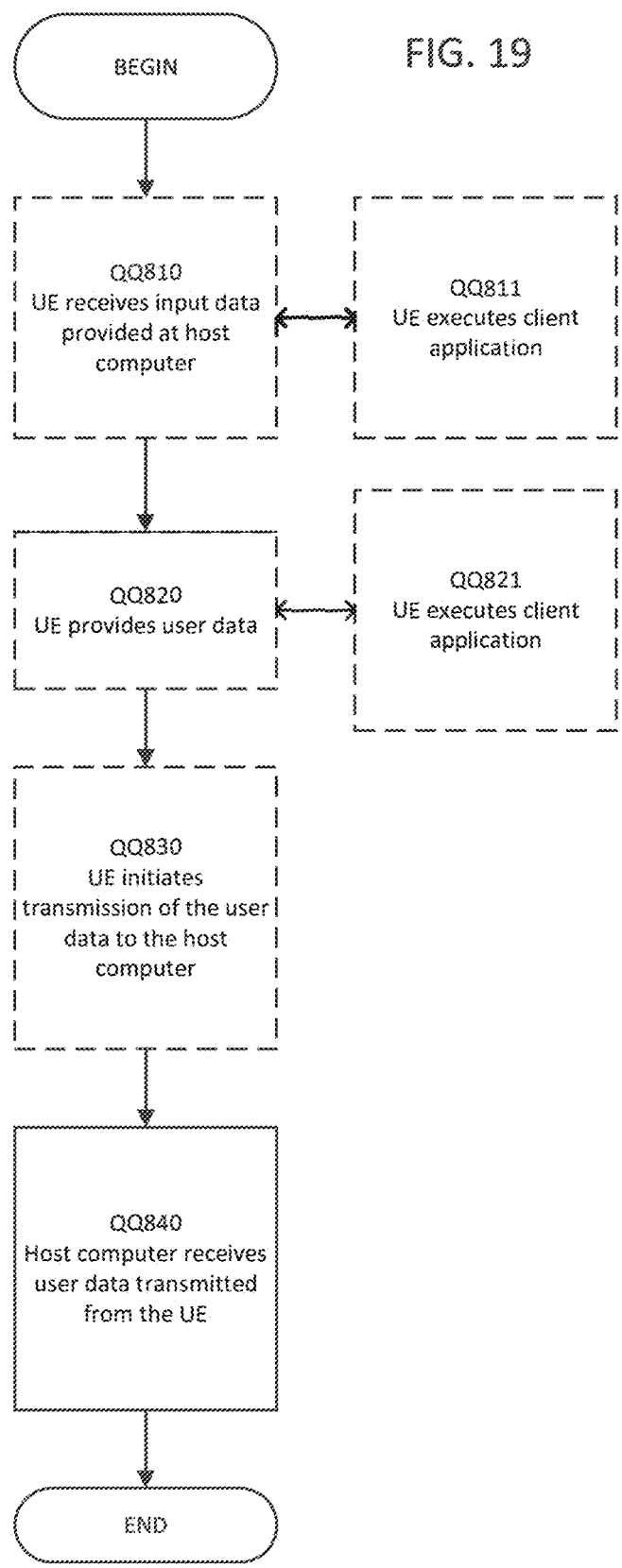
FIG. 19 is a block diagram of methods implemented in a communication system including a host computer, a base station and a user equipment in accordance with some embodiments.

FIG. 19 is a flowchart illustrating a method implemented in a communication system, in accordance with one embodiment. The communication system includes a host computer, a base station and a UE which may be those described with reference to FIGS. 15 and 16. For simplicity of the present disclosure, only drawing references to FIG. 19 will be included in this section. In step QQ810 (which may be optional), the UE receives input data provided by the host computer. Additionally or alternatively, in step QQ820, the UE provides user data. In substep QQ821 (which may be optional) of step QQ820, the UE provides the user data by executing a client application. In substep QQ811 (which may be optional) of step QQ810, the UE executes a client application which provides the user data in reaction to the received input data provided by the host computer. In providing the user data, the executed client application may further consider user input received from the user. Regardless of the specific manner in which the user data was provided, the UE initiates, in substep QQ830 (which may be optional), transmission of the user data to the host computer. In step QQ840 of the method, the host computer receives the user data transmitted from the UE, in accordance with the teachings of the embodiments described throughout this disclosure.

Figure 20:
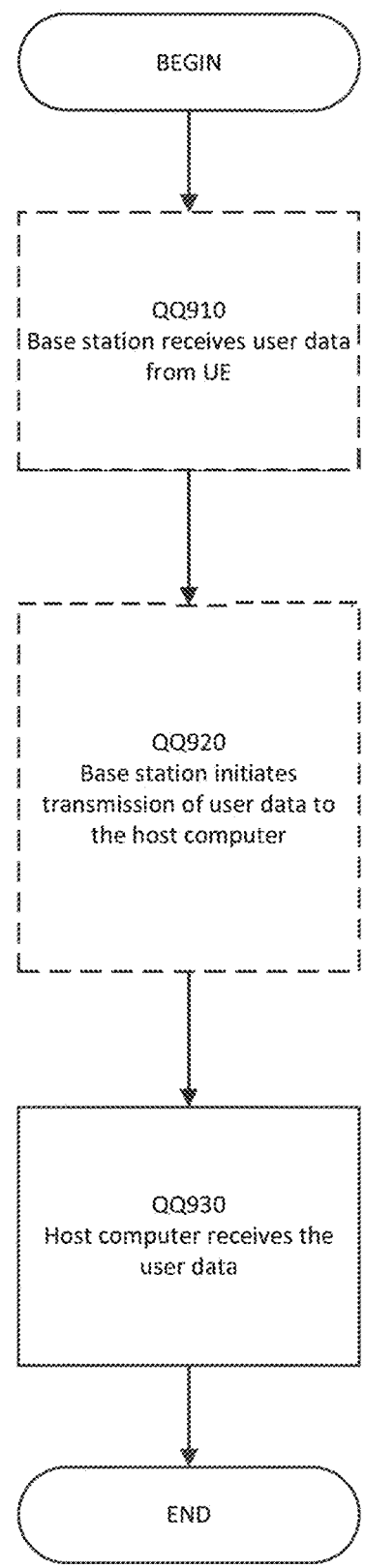
FIG. 20 is a block diagram of methods implemented in a communication system including a host computer, a base station and a user equipment in accordance with some embodiments.

FIG. 20 is a flowchart illustrating a method implemented in a communication system, in accordance with one embodiment. The communication system includes a host computer, a base station and a UE which may be those described with reference to FIGS. 15 and 16. For simplicity of the present disclosure, only drawing references to FIG. 20 will be included in this section. In step QQ910 (which may be optional), in accordance with the teachings of the embodiments described throughout this disclosure, the base station receives user data from the UE. In step QQ920 (which may be optional), the base station initiates transmission of the received user data to the host computer. In step QQ930 (which may be optional), the host computer receives the user data carried in the transmission initiated by the base station.

Any appropriate steps, methods, features, functions, or benefits disclosed herein may be performed through one or more functional units or modules of one or more virtual apparatuses.

Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The invention claimed is:

1. A method of operating a base station of a wireless communication network, the method comprising:
 generating a set of parameters that define a plurality of potential, Physical Downlink Control Channel, PDCCH, monitoring occasions and that define a plurality of paging occasions being associated with a paging frame, wherein the set of parameters include a length parameter that defines a length of each of the plurality of paging occasions as:
  a number of potential PDCCH monitoring occasions that is included in a paging occasion, or
  a number of beams used to transmit a page during a paging occasion; and
 transmitting the set of parameters over a radio interface to a wireless device.

2. The method of claim 1, wherein the set of parameters are generated for consecutive paging occasions that are spaced apart in time with at least one of the potential PDCCH monitoring occasions therebetween not being included in any of the plurality of paging occasions.

3. The method of claim 1, wherein the set of parameters include a first parameter defining the plurality of potential PDCCH monitoring occasions, the first parameter indicating a time pattern of PDCCH monitoring occasions being repeated in every slot in the paging frame.

4. The method of claim 1 further comprising:
 transmitting a paging message for the wireless device using at least one of the potential PDCCH monitoring occasions included in at least one of the paging occasions as defined by the set of parameters.

5. The method of claim 1, wherein the set of parameters are generated to define the potential PDCCH monitoring occasions of a subset for a paging occasion are associated with different beams.

6. The method of claim 1, wherein the set of parameters are generated to define the potential PDCCH monitoring occasions of a subset for a paging occasion are associated with different beams, the method further comprising:
 transmitting a paging message for the wireless terminal using one of the plurality of paging occasions so that the paging message is transmitted using at least two of the potential PDCCH monitoring occasions of the subset for the paging occasion using the different beams.

7. The method of claim 1, further comprising:
scheduling a transmission for a second wireless device using a resource including the at least one of the potential PDCCH monitoring occasions that is not included in any of the plurality of paging occasions.

8. The method of claim 7 further comprising:
communicating the transmission between the second wireless device and the base station using the resource including the at least one of the potential PDCCH monitoring occasions that is not included in any of the plurality of paging occasions.

9. The method of claim 7, wherein the transmission is an uplink transmission, wherein scheduling the uplink transmission comprises scheduling a TDD uplink transmission for the second wireless device.

10. The method of claim 1, further comprising determining a number of potential PDCCH monitoring occasions, and generating the set of parameters based on the number of potential PDCCH monitoring occasions.

11. A method of operating a wireless device in a wireless communication network, the method comprising:
receiving a set of parameters that define a plurality of potential Physical Downlink Control Channel, PDCCH, monitoring occasions and that define a plurality of paging occasions being associated with a paging frame, wherein the set of parameters include a length parameter that defines a length of each of the plurality of paging occasions as:
a number of potential PDCCH monitoring occasions that is included in a paging occasion, or
a number of beams used to transmit a page during a paging occasion; and
monitoring for paging messages based on the set of parameters that define the plurality of potential PDCCH monitoring occasions and the plurality of paging occasions.

12. The method of claim 11, wherein the parameter indicates a number of consecutive paging occasions that are spaced apart in time with at least one of the potential PDCCH monitoring occasions therebetween not being included in any of the plurality of paging occasions.

13. The method of claim 11, wherein the set of parameters include a first parameter defining the plurality of potential PDCCH monitoring occasions, the first parameter indicating a time pattern of PDCCH monitoring occasions being repeated in every slot in the paging frame.

14. The method of claim 11 further comprising:
receiving a paging message for the wireless device using at least one of the potential PDCCH monitoring occasions included in at least one of the paging occasions as defined by the set of parameters.

15. The method of claim 11 further comprising:
transmitting an uplink communication responsive to receiving the paging message.

16. The method of claim 11, wherein monitoring comprises monitoring for paging messages using potential PDCCH monitoring occasions included in the paging occasions without monitoring the at least one of the potential PDCCH monitoring occasions that is not included in any of the plurality of paging occasions.

17. The method of claim 11, wherein the plurality of paging occasions are associated with a paging frame.

18. The method of claim 17, wherein the set of parameters include offset parameters defining respective offsets for each of the respective paging occasions with respect to a beginning of the paging frame.

19. The method of claim 18, wherein the offset parameters are defined based on a number of potential PDCCH monitoring occasions.

20. A wireless device comprising:
a processor; and
memory coupled with the processor, wherein the memory comprises instructions that when executed by the processor cause the processor to:
receive a set of parameters that define a plurality of potential Physical Downlink Control Channel, PDCCH, monitoring occasions and that define a plurality of paging occasions being associated with a paging frame, wherein the set of parameters include a length parameter that defines a length of each of the plurality of paging occasions as:
a number of potential PDCCH monitoring occasions that is included in a paging occasion, or
a number of beams used to transmit a page during a paging occasion; and
monitor for paging messages based on the set of parameters that define the plurality of potential PDCCH monitoring occasions and the plurality of paging occasions.

21. A network node comprising:
a processor; and
memory coupled with the processor, wherein the memory comprises instructions that when executed by the processor cause the processor to:
generating a set of parameters that define a plurality of potential, Physical Downlink Control Channel, PDCCH, monitoring occasions and that define a plurality of paging occasions being associated with a paging frame, wherein the set of parameters include a length parameter that defines a length of each of the plurality of paging occasions as:
a number of potential PDCCH monitoring occasions that is included in a paging occasion, or
a number of beams used to transmit a page during a paging occasion; and
transmitting the set of parameters over a radio interface to a wireless device.

* * * * *